(12) United States Patent
Jecha et al.

(10) Patent No.: US 7,120,634 B2
(45) Date of Patent: Oct. 10, 2006

(54) COMPUTERIZED PREPRESS

(75) Inventors: Steven Jecha, Minneapolis, MN (US); Winfield A. Mitchell, Minneapolis, MN (US)

(73) Assignee: Vista Print Technologies Limited, (BM)

( * ) Notice: Subject to any disclaimer, the term of this patent is extended or adjusted under 35 U.S.C. 154(b) by 0 days.

(21) Appl. No.: 09/877,266

(22) Filed: Jun. 8, 2001

(65) Prior Publication Data

US 2001/0029514 A1   Oct. 11, 2001

Related U.S. Application Data

(63) Continuation of application No. 08/982,438, filed on Dec. 2, 1997, now Pat. No. 6,247,011.

(51) Int. Cl.
*G06F 7/00* (2006.01)
*G06F 17/30* (2006.01)
*G06F 17/00* (2006.01)

(52) U.S. Cl. .................. 707/9; 707/100; 715/517; 715/530

(58) Field of Classification Search .......... 707/9, 707/501.1, 506, 517, 530, 1, 526, 513, 500; 348/181, 189, 191; 358/1.1, 1.2, 1.13, 1.15; 345/589, 763, 848, 904; 713/200; 715/501.1, 715/506, 517, 530, 526, 513, 500
See application file for complete search history.

(56) References Cited

U.S. PATENT DOCUMENTS

| | | | |
|---|---|---|---|
| 5,140,676 A | 8/1992 | Langelaan | |
| 5,210,824 A * | 5/1993 | Putz et al. | 715/523 |
| 5,239,625 A * | 8/1993 | Bogart et al. | 345/428 |
| 5,508,718 A | 4/1996 | Haikin | 345/601 |
| 5,555,496 A | 9/1996 | Tackbary et al. | 705/27 |
| 5,600,563 A | 2/1997 | Cannon et al. | 700/117 |
| 5,751,590 A | 5/1998 | Cannon et al. | 700/233 |
| 5,752,053 A | 5/1998 | Takakura et al. | |
| 5,790,790 A | 8/1998 | Smith et al. | 709/206 |
| 5,793,966 A | 8/1998 | Amstein et al. | 709/203 |
| 5,796,952 A | 8/1998 | Davis et al. | 709/224 |
| 5,819,014 A | 10/1998 | Cry et al. | 358/1.15 |
| 5,819,271 A | 10/1998 | Mahoney et al. | 707/9 |
| 5,825,986 A | 10/1998 | Ferguson | 358/1.9 |
| 5,845,299 A * | 12/1998 | Arora et al. | 715/513 |
| 5,845,302 A | 12/1998 | Cyman, Jr. et al. | 707/517 |
| 5,848,413 A | 12/1998 | Wolff | 707/10 |

(Continued)

FOREIGN PATENT DOCUMENTS

EP   0384986 A2 * 12/1989

(Continued)

OTHER PUBLICATIONS

Newsbytes News Network; "Adobe Ships PressWise 2.5 For Mac (Adobe Systems has shipped Presswise version 2.5 Mac-based pre-press tool that includes preflight, color separation features)"; Jun. 15, 1995; pp. 1 and 2.*

(Continued)

*Primary Examiner*—Ella Colbert
(74) *Attorney, Agent, or Firm*—Robert L. Dulaney

(57) ABSTRACT

Computerized prepress is disclosed. In one embodiment, a computerized prepress system includes three components: a server, a client and a printer. The server has stored thereon an authoring program to create a document, and a translation program to translate the document to a suitable prepress format. The client downloads the authoring program from the server to create the document, and then uploads the document to the server for translation to the suitable prepress format. The printer receives the document as translated to the suitable prepress format from the server.

44 Claims, 16 Drawing Sheets

U.S. PATENT DOCUMENTS

| | | | | |
|---|---|---|---|---|
| 5,870,089 | A | 2/1999 | Fabbio et al. | 345/733 |
| 5,870,552 | A | 2/1999 | Dozier et al. | 709/219 |
| 5,877,766 | A | 3/1999 | Bates et al. | 345/854 |
| 5,880,740 | A | 3/1999 | Halliday et al. | 345/629 |
| 5,884,014 | A | 3/1999 | Huttenlocher et al. | 358/1.15 |
| 5,892,909 | A | 4/1999 | Grasso et al. | 709/201 |
| 5,930,810 | A * | 7/1999 | Farros et al. | 235/381 |
| 5,960,164 | A | 9/1999 | Dorfman et al. | |
| 5,963,641 | A | 10/1999 | Crandall et al. | 380/2 |
| 5,995,723 | A | 11/1999 | Sperry et al. | 358/1.15 |
| 6,012,070 | A * | 1/2000 | Cheng et al. | 715/505 |
| 6,020,894 | A * | 2/2000 | Silverbrook | 345/619 |
| 6,026,433 | A | 2/2000 | D'Arlach et al. | 709/217 |
| 6,049,390 | A * | 4/2000 | Notredame et al. | 358/1.15 |
| 6,057,858 | A * | 5/2000 | Desrosiers | 345/467 |
| 6,182,092 | B1 * | 1/2001 | Francis et al. | 715/513 |
| 6,189,020 | B1 * | 2/2001 | Shimizu | 715/526 |
| 6,201,611 | B1 | 3/2001 | Carter et al. | 358/1.15 |
| 6,259,446 | B1 * | 7/2001 | Matheny et al. | 345/764 |
| 6,343,302 | B1 | 1/2002 | Graham | 715/501.1 |
| 6,453,127 | B1 | 9/2002 | Wood et al. | 399/8 |
| 6,469,796 | B1 | 10/2002 | Leiman et al. | 358/1.15 |
| 6,631,008 | B1 | 10/2003 | Aoki | 358/1.15 |
| 6,684,369 | B1 | 1/2004 | Bernardo et al. | 715/513 |

FOREIGN PATENT DOCUMENTS

| | | |
|---|---|---|
| EP | 0475601 A2 | 3/1992 |
| EP | 0689157 | 12/1995 |
| EP | 0 982 650 | 3/2000 |

OTHER PUBLICATIONS

Cross, Richard and Smith, Janet; "Internet marketing that works for customers. (Interactive Marketing)"; Direct Marketing, V58, n4, P22 (3); Aug. 1995; pp. 1-4.*

Edwards, Stephen; Kingsley, Lawrence; Votsch, Victor; Walter, Mark; "Roll over, Gutenberg: how the Web is changing printing"; Sep. 1997; Seybold Report on Internet Publishing; V2, N1, pp. 1-18.

Print outs from Banc JEX Insty Prints online printing catalog,, on-line on Internet in 1996-97.

Print outs from BizCards Online business card catalog, on-line Internet in May 1997.

Print outs from www.iprint.com web site. It is Applicants' belief that this web site was available sometime in early 1997, prior to the Applicants' filing date. This is not admitted as a fact, however, as this has not been independently confirmed by Applicants.

Fällström; "Using a Simulator for Testing and Validating a Newspaper Production Decision Support System"; 30th Hawaii Intl Conf on System Sciences; Jan. 1997; pp. 387-396.

Walker, "Supporting Document Development with Concordia", IEEE, 1988, pp. 355-364.

Chamberlin, et al, "Quill: An Extensible System for Editing Documents of Mixed Type", IEEE, pp. 317-326.

Schonhut, et al, "Constructive Page Description", IEEE Computer Graphics and Applications, Mar. 1991, pp. 71-78.

Brooks, "Lilac: A Two-View Document Editor", IEEE, Jun. 1991, pp. 7-19.

House, et al, "An On-Line Communication Print Service for the Demanding Client", SIGDOC'93, pp. 135-140.

Shore, "Acrobat 2.0", Compcon 1995, Mar. 1995, p. 379.

* cited by examiner

COMPUTERIZED PREPRESS

This is a Countinuation of application Ser. No. 08/982,438, filed Dec. 2, 1997, now U.S. Pat. No. 6,247,011.

FIELD OF THE INVENTION

This invention relates generally to print and print-publishing prepress, and more particularly to such prepress that is computerized.

BACKGROUND OF THE INVENTION

The publishing process typically requires several steps to successfully complete a printed publication. Such steps include planning and organizing, design and content development, and prepress tasks where electronic files are prepared to be reproduced with ink on paper. Broadly speaking, prepress involves the preparation of all the electronic files that will be utilized to create a publication printed with paper and ink. For a professional publication, this usually involves utilizing an authoring program to create the electronic version of the publication itself, and then using another program (which may be a component of the authoring program), to translate this electronic version into a format from which paper and ink copies of the publication can be printed.

Portions if not all of the prepress process is difficult for non-professionals to accomplish, however. While tools such as Adobe PageMaker and Quark Express enable professionals to more easily create professional-looking documents, most non-professionals find these computer programs overly complex and difficult to use. That is, although the computers sitting on the desks of such non-professionals are sufficiently powerful to handle such tasks, the users themselves may not be sufficiently knowledgeable to perform them. Furthermore, even for experienced professionals, the prepress process is fraught with uncertainty; for example, the professional must know the type of paper and ink output that is desired a priori before translating an electronic version of a document into a format from which paper and ink copies can be printed. That is, even for experienced professionals, the prepress process is not tightly integrated enough to attain fast, easy and cost-effective print publishing.

SUMMARY OF THE INVENTION

The above-identified shortcomings as well as other shortcomings and problems are addressed by the present invention, which will be understood by reading and studying the following specification. In one embodiment, a computerized prepress system includes three components: a server, a client and a printer. The server has stored thereon an authoring program to create a document, and a translation program to translate the document to a suitable prepress format. The client downloads the authoring program from the server to create the document, and then uploads the document to the server for translation to the suitable prepress format. The printer receives the document as translated to the suitable prepress format from the server, such that the printer may then print copies of the document.

More specifically, in one particular embodiment of the invention, the authoring program is written in the programming language Java, and the client, server and printer are each connected to an intranet the Internet. Thus, a user at the client needs only to run a web browser program, such as Netscape Navigator, to access the server and download and run the authoring program. Once the user has created a document with the authoring program, it is saved at the server. The server may then as required translate the document into a suitable prepress format—such as PostScript—and send it to the printer (e.g., as a MIME-compliant electronic mail) for printing.

The invention thus provides for several advantages. The user at the client does not need to know anything about the prepress format required by the printer. Since the server stores the authoring program that is then downloaded to the client for creation of a document, the server can maintain the authoring program such that it knows both the format to which the authoring program saves the document, and the format to which the document must be translated for printing at the printer. Furthermore, the authoring program stored at the server may be as simple as necessary for novice users to comfortably use, or as powerful as necessary for experienced users to use. The professional user benefits from the tight integration of the invention, in that the professional user need only be concerned with creating the document, and not the manner by which the document will ultimately be printed with paper and ink, which may already be preselected within the server.

In different embodiments of the invention, computerized methods, computerized systems, computers, and computer-readable media of varying scope are described. Still other and further embodiments, aspects and advantages of the invention will become apparent by reference to the drawings and by reading the following detailed description.

DETAILED DESCRIPTION OF THE INVENTION

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Figure 1:
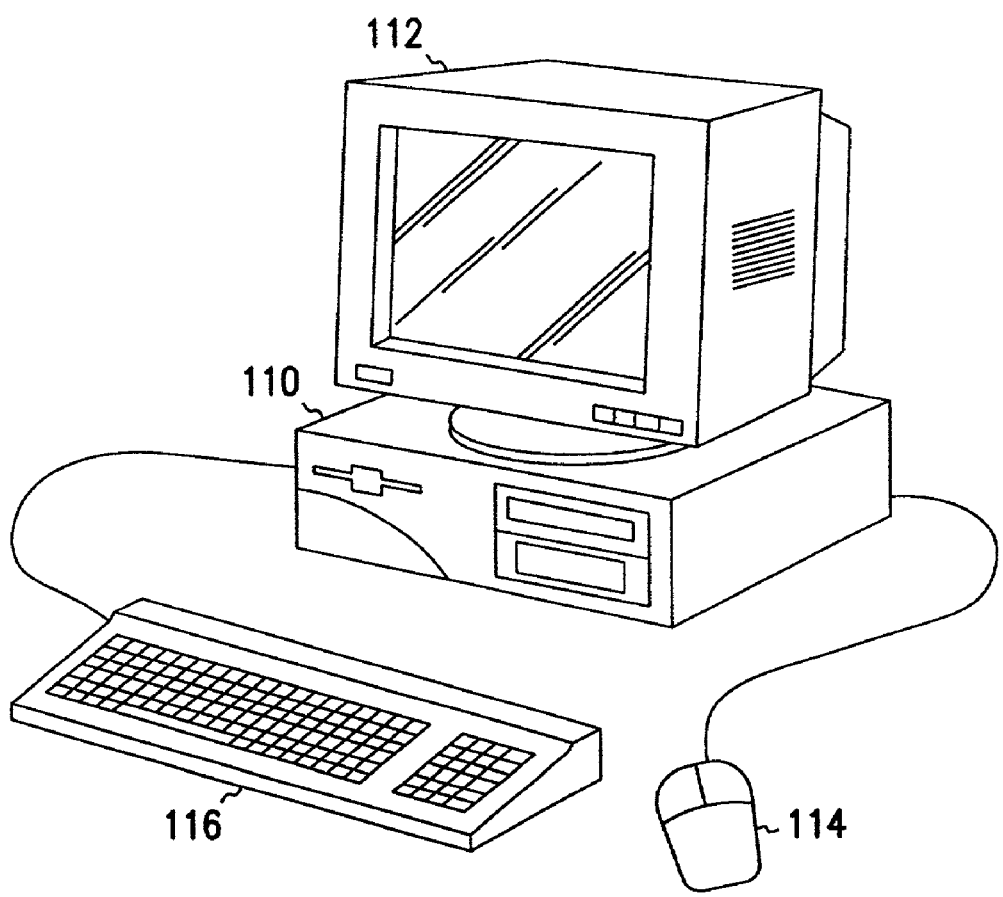
FIG. 1 is a diagram of a computer in conjunction with which embodiments of the invention may be implemented.

Referring first to FIG. 1, a diagram of a computer in conjunction with which embodiments of the invention may be implemented is shown. Computer 110 is operatively coupled to display device 112, pointing device 114, and keyboard 116. Computer 110 includes a processor (preferably, an Intel Pentium processor), random-access memory (RAM) (preferably, at least thirty-two megabytes), read-only memory (ROM), and one or more storage devices, such as a hard disk drive, a floppy disk drive (into which a floppy disk can be inserted), an optical disk drive, and a tape cartridge drive. The memory, hard drives, floppy disks, etc., are types of computer-readable media. The hard drives and floppy disks are more specifically types of nonvolatile store media. Computer programs running on the computer are executed by the processor from the computer-readable media. The invention is not particularly limited to any type of computer 110. Computer 110 preferably is a PC-compatible computer or a MacOS-compatible computer. The construction and operation of such computers are well known within the art.

Furthermore, computer 110 may be communicatively connected to the Internet via a communication device, any particular manner by which the invention is not limited to, and which is not shown in FIG. 1. Internet connectivity is well known within the art. In one embodiment, the computer includes a communication device that is a modem and corresponding communication drivers to connect to the Internet via what is known in the art as a "dial-up connection." In another embodiment, the computer includes a communication device that is an Ethernet or similar hardware (network) card to connect to a local-area network (LAN) that itself is connected to the Internet via what is know in the art as a "direct connection" (e.g., T1 line, etc.).

Computer 110 also has at least one operating environment running thereon, each desirably providing a graphical user interface including a user-controllable pointer. Such operating environments include operating systems such as versions of the Microsoft Windows and Apple MacOS operating systems known in the art. The invention is not limited to any particular operating environment, however, and the construction and use of such operating environments are well known within the art. Computer 110 also desirably has at least one web browser application program running with at least one operating environment, to permit users of computer 110 to access intranet or Internet world-wide-web pages as addressed by Universal Resource Locator (URL) addresses. Such browser application programs include Netscape Navigator and Microsoft Internet Explorer.

Display device 112 permits the display of information, including computer, video and other information, for viewing by a user of the computer. The invention is not limited to any particular display device 112. Such display devices include cathode ray tube (CRT) displays (monitors), as well as flat panel displays such as liquid crystal displays (LCD's). Pointing device 114 permits the control of the screen pointer provided by the graphical user interface of operating systems such as versions of Microsoft Windows. The invention is not limited to any particular pointing device 114. Such pointing devices include mouses, touch pads, trackballs, remote controls and point sticks. Finally, keyboard 116 permits entry of textual information into computer 110, as known within the art, and the invention is not limited to any particular type of keyboard.

Figure 2:
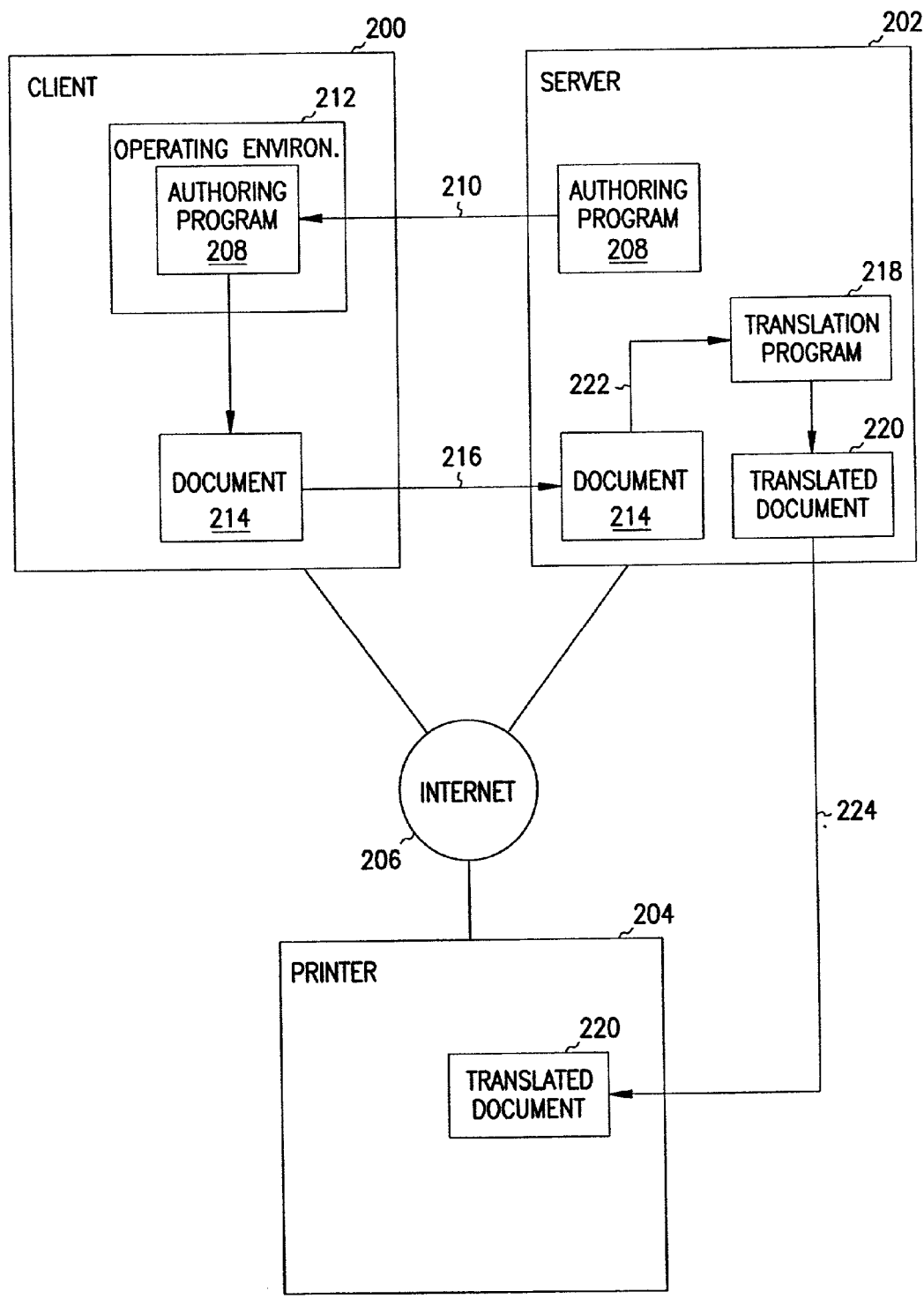
FIG. 2 is a diagram of a computerized prepress system in accordance with one embodiment of the invention.

Referring next to FIG. 2, a diagram of a computerized system in accordance with one embodiment of the invention is shown. Each of client computer 200, server computer 202, and printer computer 204 is a computer, such as that shown in and described in conjunction with FIG. 1, although the invention is not so limited. Thus, each of client computer 200, server computer 202, and printer computer 204 has a processor, a computer-readable medium from which computer programs are executed by the processor, and a communications device, such as a network card, or a modem. Client computer 200, server computer 202, and printer computer 204 are communicatively coupled to one another via the Internet 206. Note that in one embodiment, Internet 206 is replaced by an extranet or an intranet, as known within the art, and as may be found in corporate and other environments.

Server computer 202 is desirably an extranet, intranet or Internet world-wide-web server, as known in the art, such that it has assigned thereto a Universal Resource Locator (URL) address to permit client computer 200, as well as other computers, to access the server. The invention is not particularly limited to a type of server 202. Typical examples include those running software available from Netscape, Microsoft, Apache, NCSA, and others. Server 202 is also not limited to running on a particular operating system (OS); common operating systems including Microsoft Windows 95, Microsoft Windows NT, Apple MacOS and UNIX.

Server computer 202 has stored thereon authoring program 208. Authoring program 208 is downloaded from server 202 by and to client 200 through the Internet 206, although this is more directly represented by arrow 210. Authoring program 208 desirably is run within operating environment 212 running on client 200. Such an operating environment 212 includes those provided by extranet, intranet and Internet world-wide-web browser programs such as Microsoft Internet Explorer and Netscape Navigator. For example, in one embodiment, authoring program 208 is coded in the programming language Java, such that program 208 is a Java applet that is downloaded through the Internet by client 200, and runs within an operating environment 212 that is a browser program that is Java capable. In other embodiments of the invention, authoring program 208 may be coded in the programming language Perl, C, C++, ActiveX, or other programming languages; the invention is not so limited.

Authoring program 208 is used within client computer 200 to create document 214. Document 214 is a document created by the user of computer 200, using authoring program 208, for printing and publishing. The invention is not limited to any type of authoring program 208; in one embodiment of the invention, authoring program 208 is that which is shown in and will be described in conjunction with FIGS. 4a–4m. The invention is also not limited to any particular document 214. In one embodiment of the invention, document 214 is a business card; however, other documents amenable to the invention include letterheads, pamphlets, brochures, envelopes, etc.

Once document 214 has been created at client 200, it is uploaded to server 202 for saving at the server, through the Internet 206, as more directly represented by arrow 216. Document 214 is saved at the server 202 on a non-volatile storage device of the server, such as a hard disk drive. It is saved in an internal file format that maximizes efficiency in the storage of the document. Once the document 214 is ready to be sent to a printer for printing and publication (as may be indicated by client 200 to server 202), server 202 runs translation program 218 on document 214 (program 218 being stored on server 202) as saved in the internal file format to generate a translated document 220, as represented by arrow 222. The translation program 218 translates document 214 into a file format suitable for prepress, such as PostScript. Other file formats suitable for prepress include HTML, PDF, and PostScript extreme, as known within the art. Translation program 218 performs any color separations, or other operations as required by the suitable prepress file format. The invention is not limited to any particular suitable prepress file format.

Server 202 then transmits the translated document 220 through the Internet 206 to printer 204, as more directly represented by arrow 224. In one embodiment, this is accomplished by server 202 attaching the translated document 220 as an attachment file to a MIME-compliant electronic mail, which may then be sent to the electronic mail address of printer 204. However, the invention is not limited to any manner by which such transmission occurs. Once the printer 204 has received the translated document 220, document 220 may then be printed and published as needed.

Figure 3:
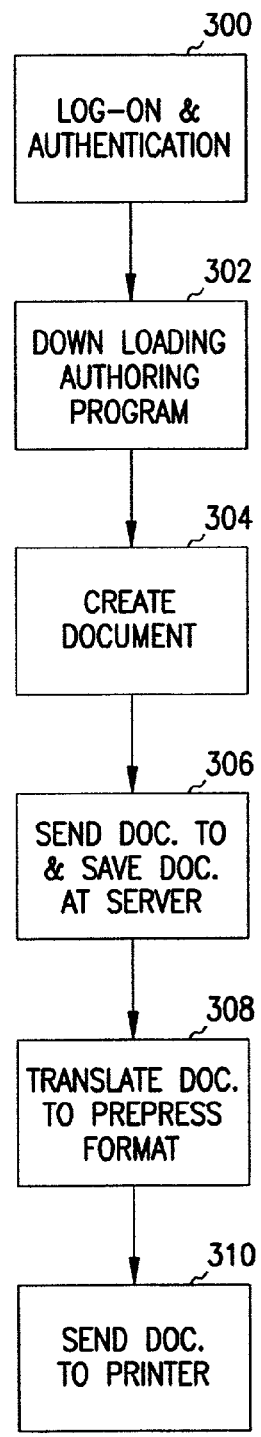
FIG. 3 is a diagram of a computerized prepress method in accordance with one embodiment of the invention; and, FIGS. 4*a*–4*m* are diagrams of screens displayed on a display device of a computer in conjunction with one embodiment of the invention.

Referring next to FIG. 3, a flowchart of a computerized method according to an embodiment of the invention is shown. This method is inclusive of the steps or acts required to be taken by a client computer, a server computer, and a printer computer to create a document at the client computer, for translation by the server computer, and for printing at the printer computer, in accordance with one embodiment of the invention. These steps or acts are performed in accordance with one or more computer programs, such as authoring programs, and translation programs, as have been described in conjunction with FIG. 2. The embodiment of the invention described in conjunction with FIG. 3 refers to the situation where the client, the server and the printer are communicatively coupled to one another through the Internet, where the client is running a web browser program and the server is a web server; however, the invention is not so limited.

In step 300, the client computer accesses the web site of the web server, as referenced by a URL address, through its web browser program, and logs onto the web server. Logging on to the server desirably includes submitting user information regarding the user at the client, such as the user's name and password. Once the server has received this information, it authenticates the user, looking up the user information submitted to determine whether such a user exists, and whether the password for the user is correct. Authentication also includes associating the user with a particular directory on the server computer (e.g., on which to store the documents created by the user), a set of defaults regarding options available to the user within the authoring program (e.g., fonts, colors, images and commands), and an authorization level. The authorization level dictates what the user is permitted to do within the program; for example, a "normal" user may be allowed to create, save and print his or her own documents, an "administrator" may be permitted to access anyone's documents within the administrator's work group, and a "demonstration" user is permitted to create documents, but not permitted to save or print them.

In step 302, the client downloads the authoring program from the server. As has been described, in one embodiment the authoring program is coded in Java, such that the program is a Java applet running within the browser program of the client. In step 304, the client then uses the authoring program to create a document, such as a business card, a letterhead, etc. Once the document has been created, in step 306 the client selects a save command, which uploads the document to the server, where it is saved. Steps 300 through 306 are iterative; the user at the client may continually save the document to the server, and then relogon at a subsequent time to again revise the document.

Once the document is in final form according to the user, the user selects a print command in step 308. This signals the server to translate the document into a suitable prepress format, such as PostScript, or another format as previously described, and send the document to the printer computer in step 310, such as an electronic mail attachment. Thus, the internal format in which the document is saved in step 306 is different than the format to which the document is translated in step 308 and sent to the printer in step 310.

Once the printer receives the document, the document may then be printed and published.

Figure 4A:
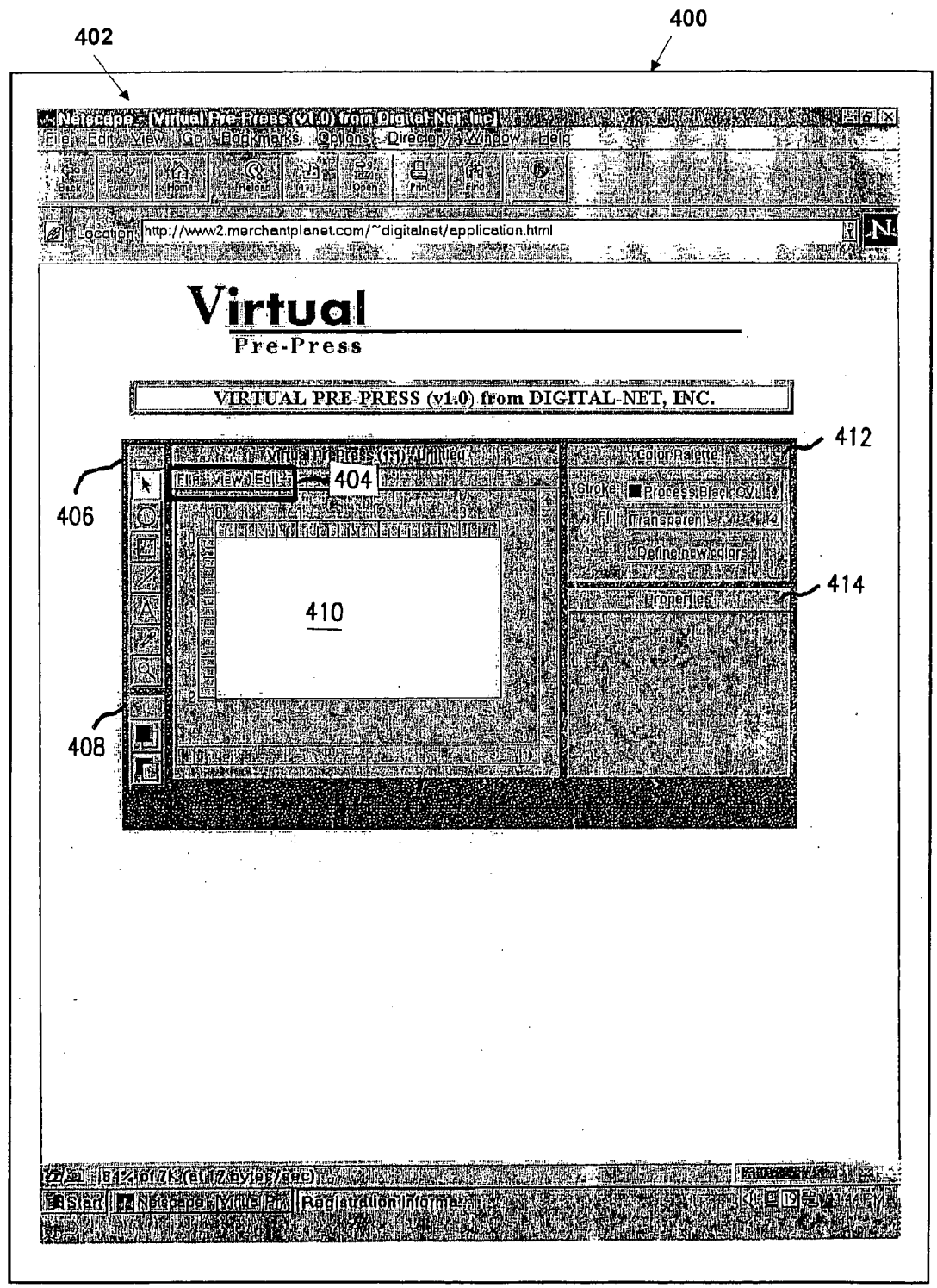

Referring next to FIGS. 4a–4m, diagrams of screens displayed on a display device of a computer in conjunction with one embodiment of the invention are shown. More particularly, the diagrams are screens regarding an authoring program according to one embodiment of the invention. Referring first to FIG. 4a, within display device 400 is operating environment window 402 within which the authoring program runs. Specifically, operating environment window 402 is part of a web browser program, such as Netscape Navigator. The authoring program is a Java applet that runs within the web browser. The authoring program includes six primary areas: menu bar 404, tool bar 406, orientation bar 408, work area 410, color palette area 412, and properties area 414. The user of the computer utilizes tool bar 406, orientation bar 408, menu bar 404, color palette area 412, and properties area 414 as tools to create a document within work area 410. Work area 410 is sized in accordance with the type of document to be created. For example, as shown in FIG. 4a, the type of document to be created is a business card. The properties area 414 shows commands that may be used in conjunction with the currently selected tool from tool bar 406.

Figure 4B:
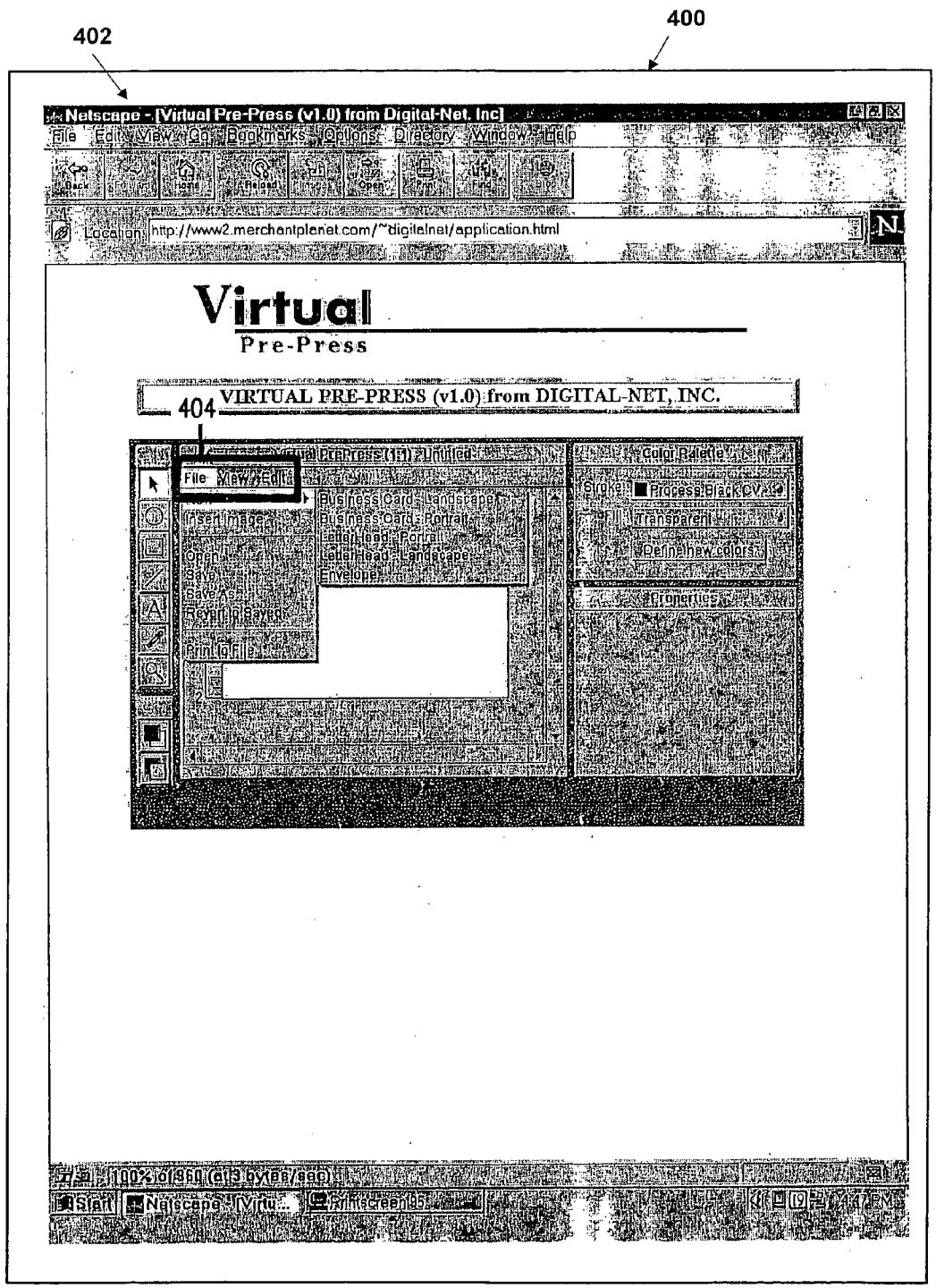

Clicking "file" on menu bar 404 drops down the file menu, as shown in FIG. 4b. The file menu permits a user to create a new document, such as a business card, letterhead, or envelope, insert an image, open or save a document, revert the current work area to the document as most recently saved, or print to a file (i.e., cause the translation program to be run). The images are saved as files on the server in a particular format, such as encapsulated PostScript, TIFF, GIF, and JPEG. Desirably, the images have a maximum resolution of 1:1, to minimize the size of the encapsulated PostScript file (or file in another format). Opening or saving a document retrieves or stores a document, respectively, on a computer-readable medium of the server. Printing the document to a file causes the translation program to run, such that the file is translated to a format suitable for prepress, and then sent to the printer.

Figure 4C:
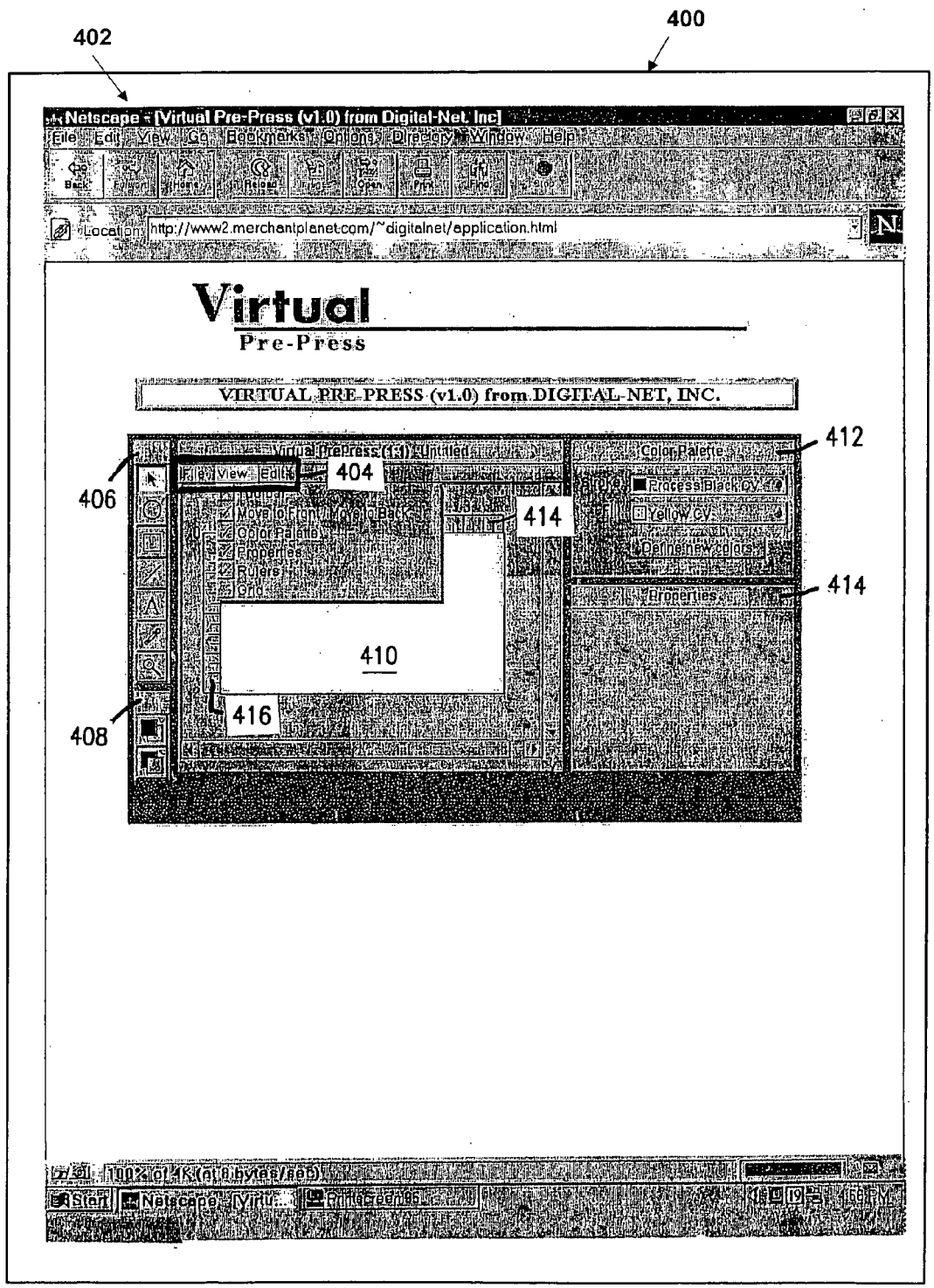

Clicking "View" on menu bar 404 drops down the view menu, as shown in FIG. 4c. The view menu permits a user to call up different tools of the authoring program, which may have become hidden from view (e.g., by previous user choice), or previously unselected by the user.

Selecting "Toolbar" calls up tool bar 406. Selecting "Move to Front/Move to Back" calls up orientation bar 408. Selecting "Color Palette" brings up color palette area 412. Selecting "Properties" brings up properties area 414. Selecting "Rulers" brings into view rulers 416 and 414, each on a side of work area 410. Finally, selecting "Grid" causes a grid to be superimposed on work area 410 (not shown in FIG. 4c).

Figure 4D:
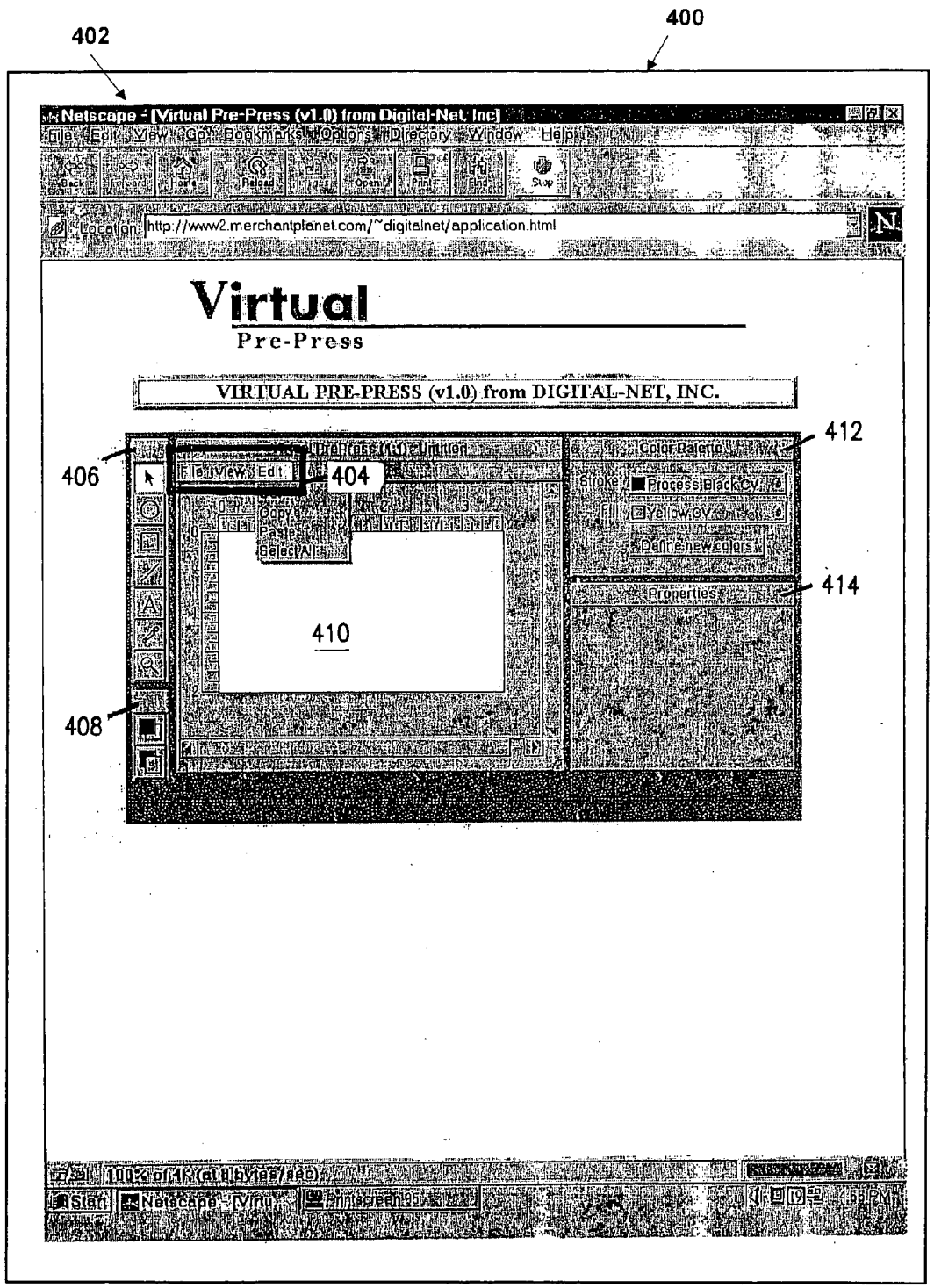

Clicking "Edit" on menu bar 404 drops down the edit menu, as shown in FIG. 4d. The edit menu permits a user to cut, copy, paste selected elements (i.e., objects) within work area 410, or select all the elements, such that the user is then able to cut, copy, or paste all the elements. The cut, copy, and paste commands thus operate as known to those of ordinary skill within the art.

Figure 4E:
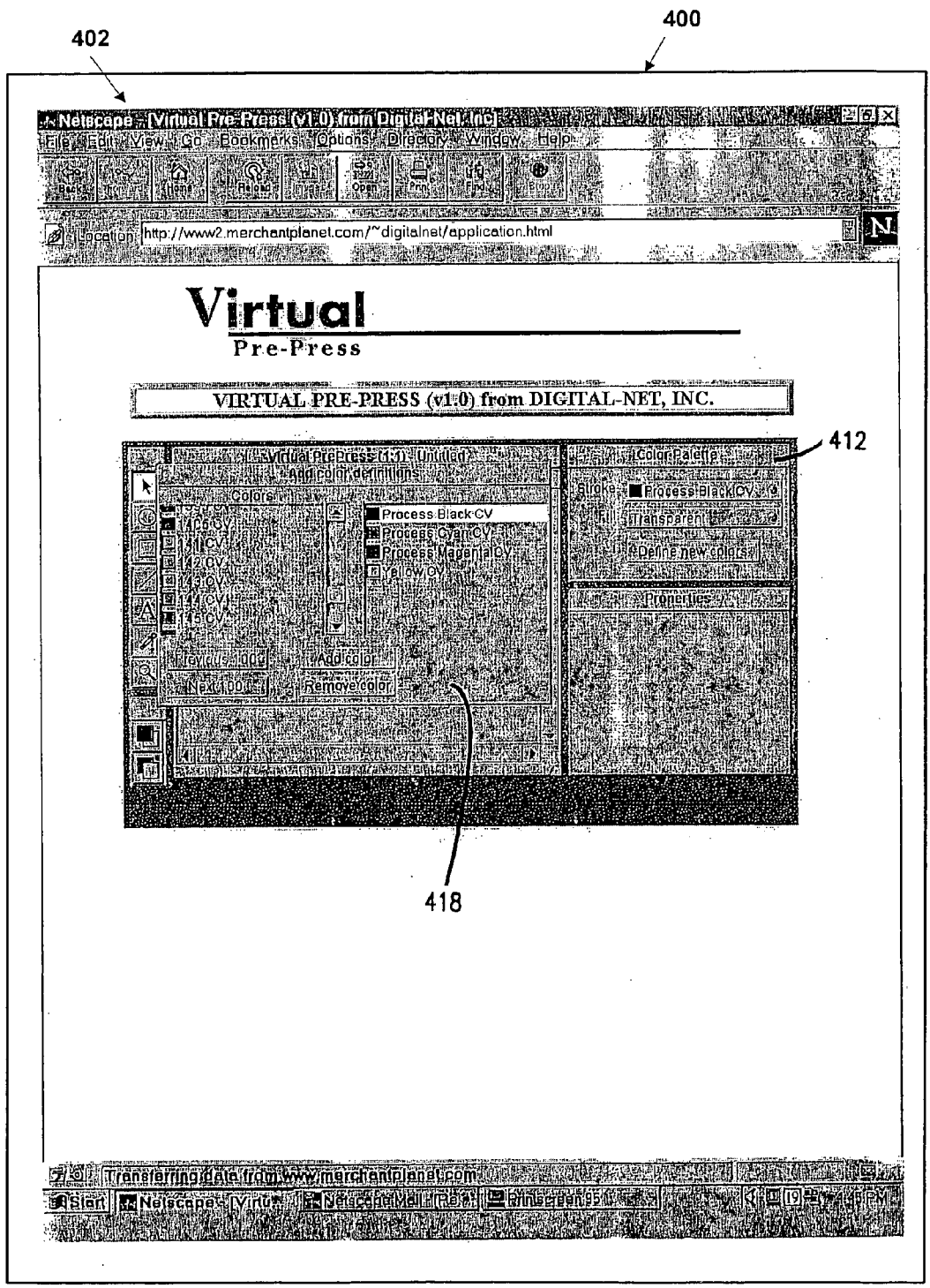

Color palette area 412 is described in conjunction with FIG. 4e. The user is able to select both stroke and fill color from a menu of predetermined colors. The stroke color refers to the color in which the boundaries of a particular object is drawn within work area 410 (not shown in FIG. 4e), while the fill color refers to the color inside the boundaries of the particular object within work area 410. Colors may be added within the menu of predetermined colors by defining a new color, accomplished by pressing the define new colors button, which brings up window 418. Within the window, the user is able to select new colors, which are desirably the entire palette of colors available from Pantone, as known within the art. In other embodiments, colors are selected from palettes of colors available from Toyo, Focaltone, or Tru-match, as also known within the art.

Figure 4F:
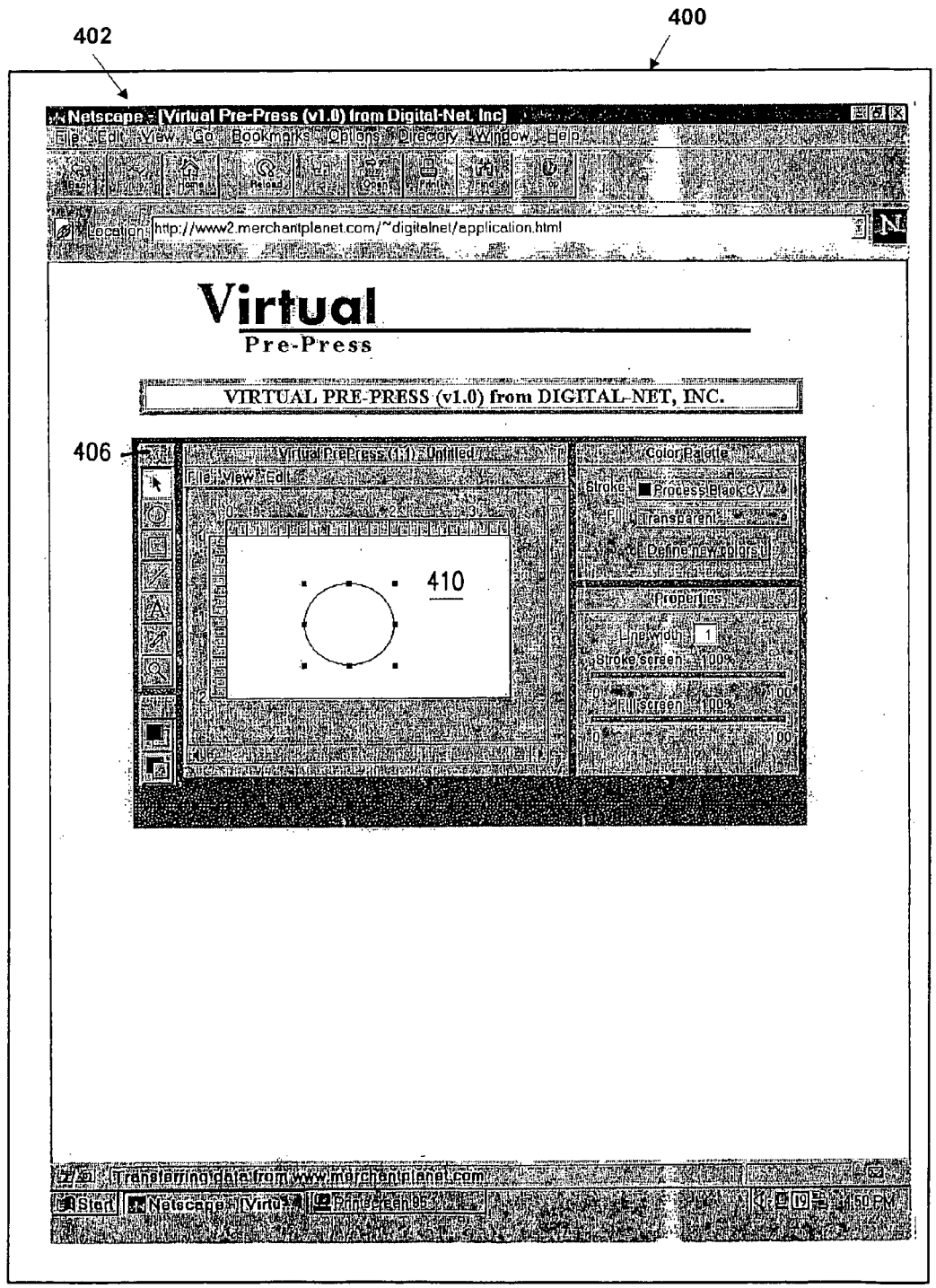
Figure 4G:
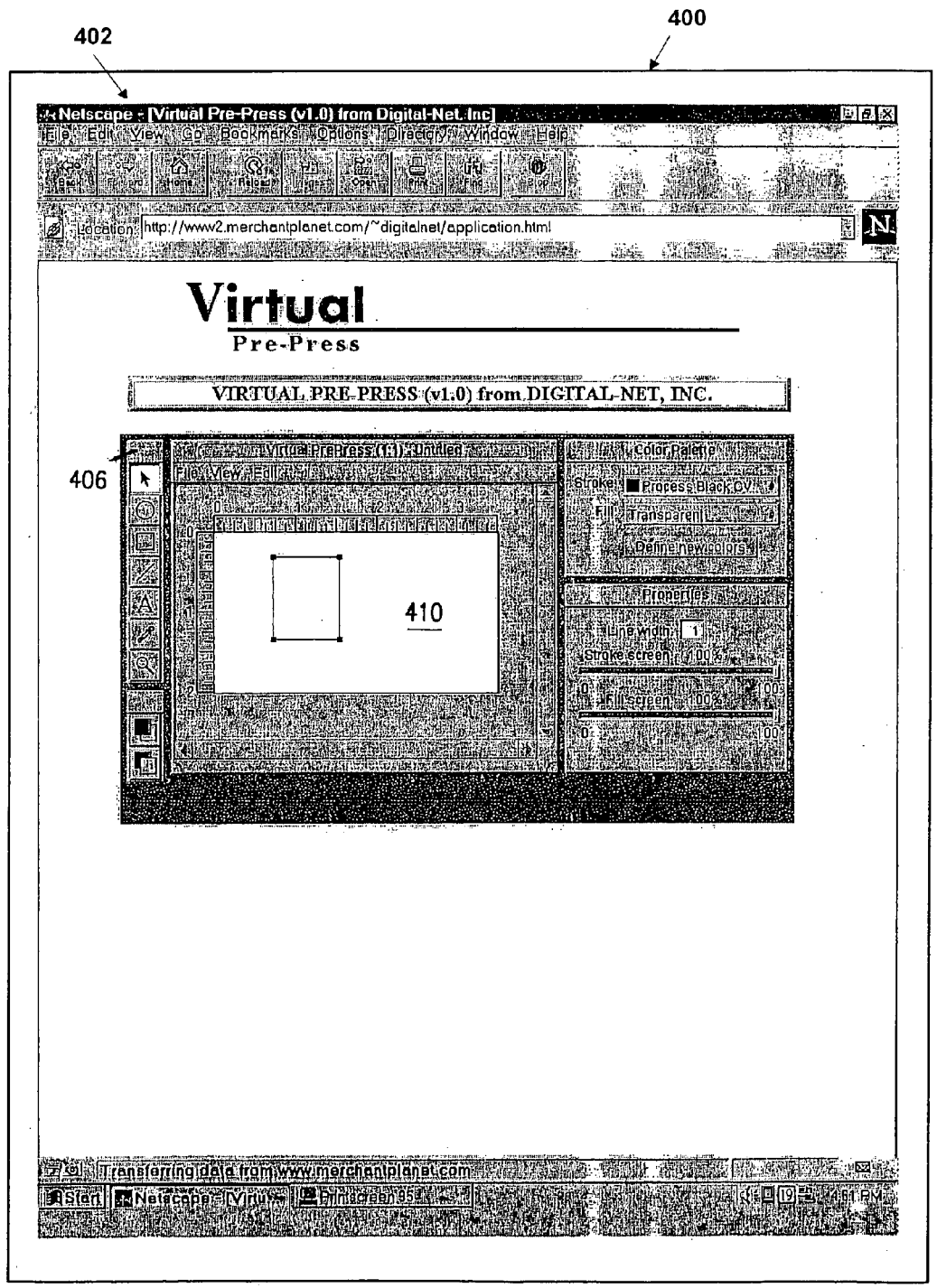
Figure 4H:
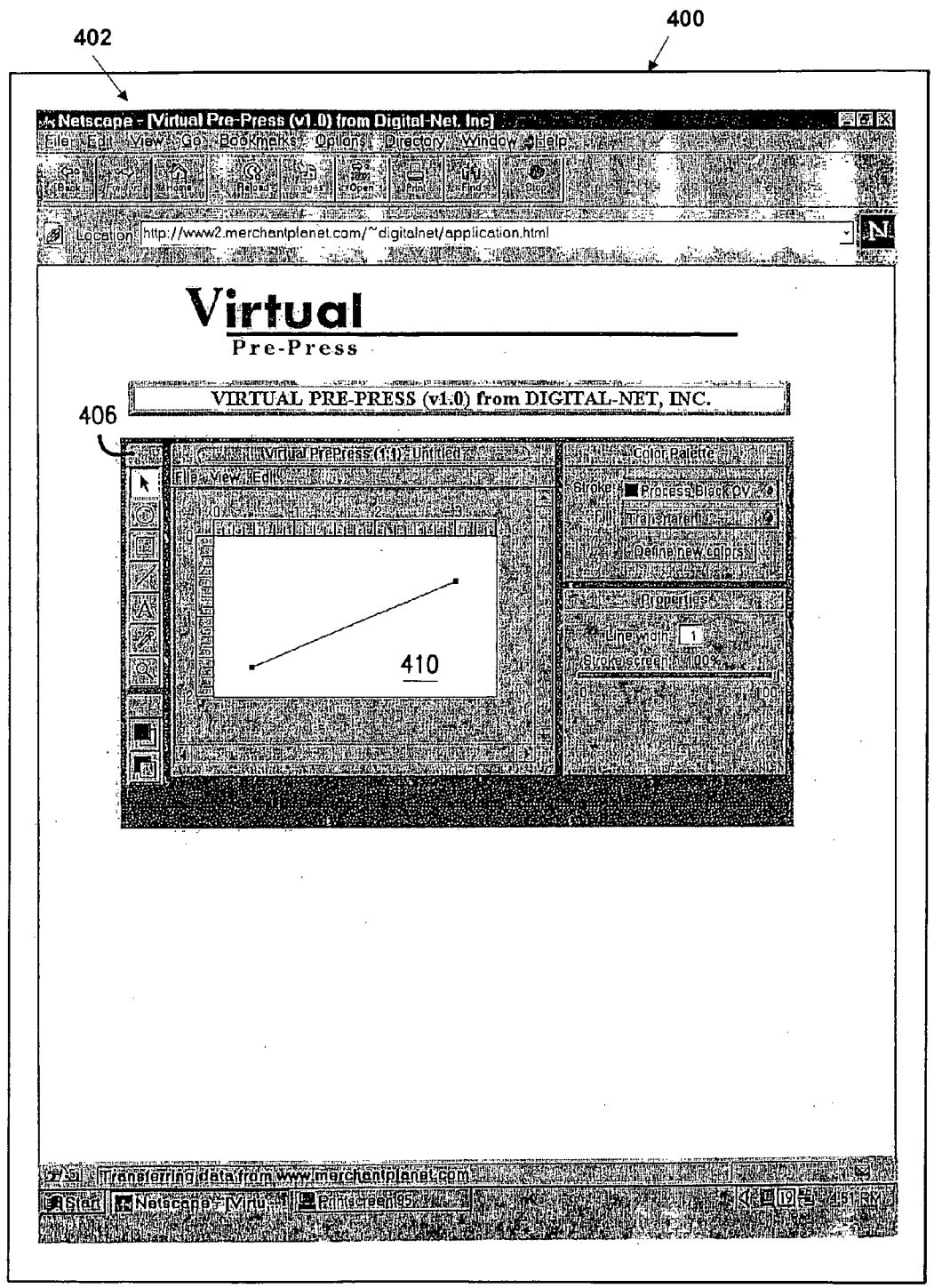

Referring next to FIG. 4*f*, selecting the arrow tool on tool bar 406 allows the user to select an object within work area 410. Selecting the circle tool on tool bar 406 enables a user to create a circle or oval, such as that shown in work area 410 in FIG. 4*f*. Referring next to FIG. 4*g*, selecting the rectangle tool on tool bar 406 permits a user to create a rectangle, such as that shown in work area 410 in FIG. 4*g*. Referring next to FIG. 4*h*, selecting the line tool on tool bar 406 enables a user to create a line, such as that shown in work area 410 in FIG. 4*h*. In the creation of a circle, rectangle, or line, the authoring program performs the creation of the particular object (e.g., the circle, the rectangle, or the line) itself, and does not consult the server to determine the manner in which the object is to be created.

Figure 4I:
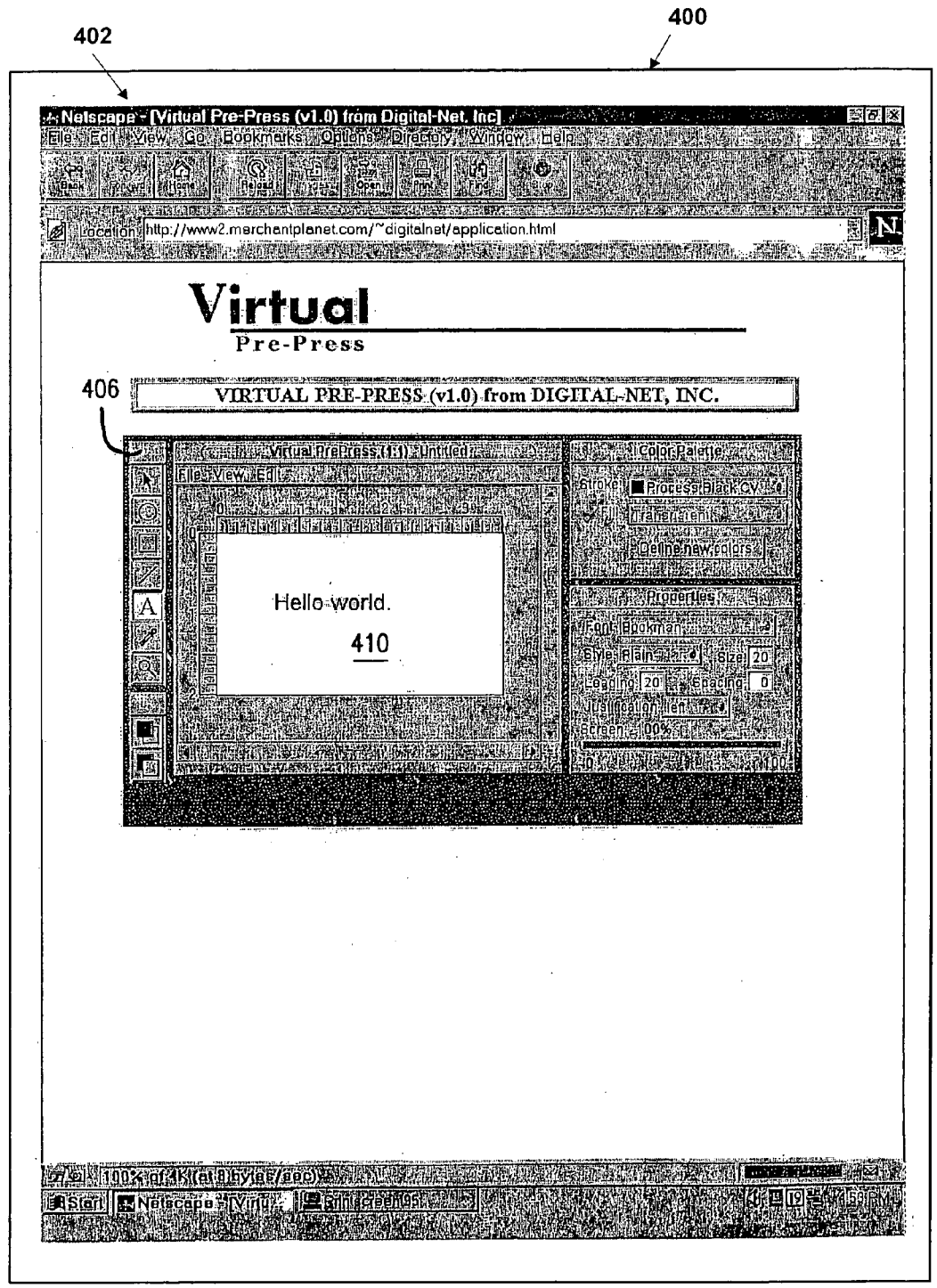
Figure 4J:
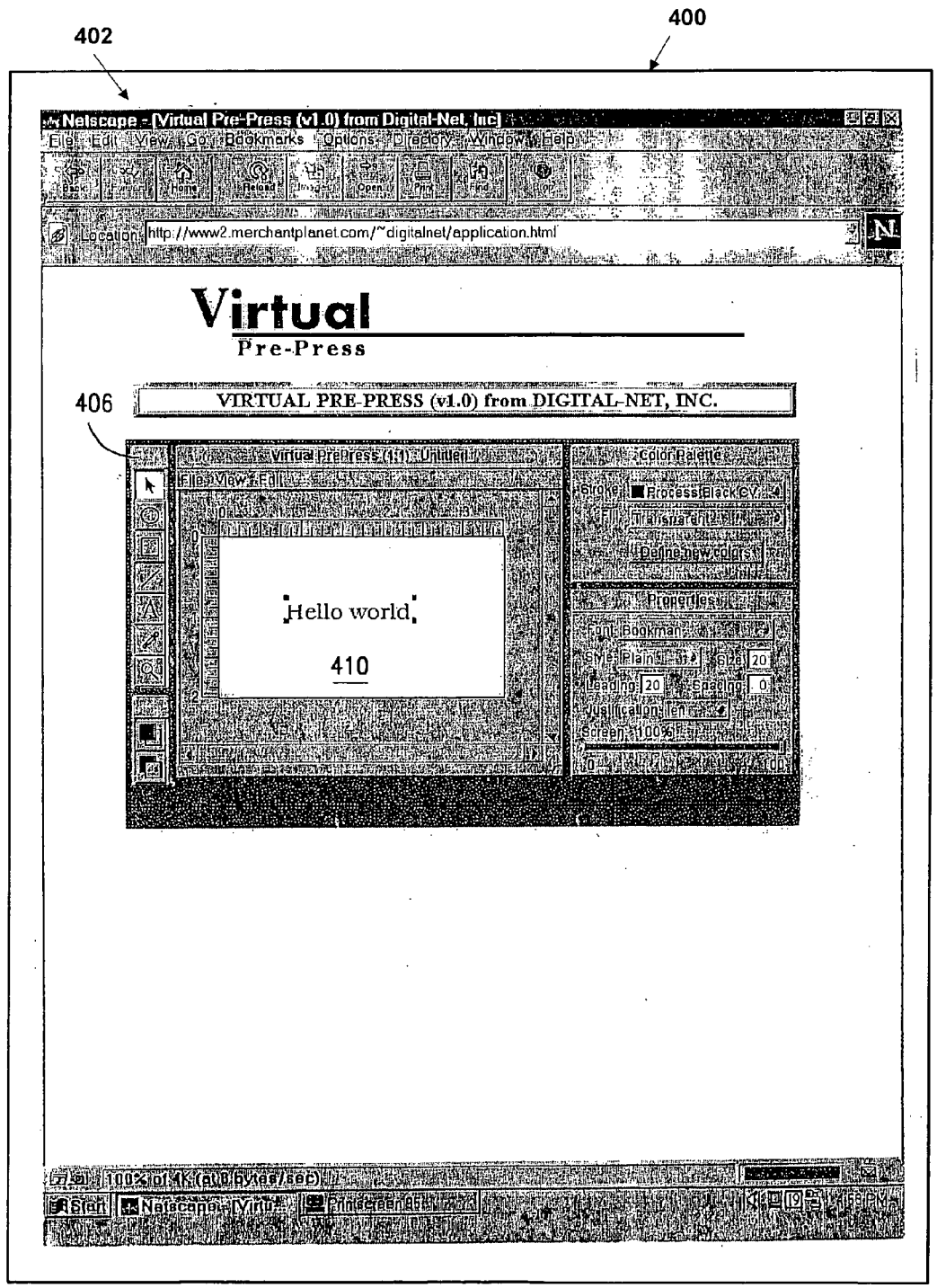

Conversely, selecting the text tool on tool bar 406 causes the authoring program to first allow the user to input the text to be entered on work area 410, displaying the text in a rough manner. Next, the authoring program sends the text to the server, which translates the text into an image, desirably an image in GIF format and having a maximum resolution of 4:1, which is then sent back to the client for display on work area 410. (Other image formats include JPEG and TIFF; the invention is not so limited.) This is shown in conjunction with FIGS. 4*i* and 4*j*. In FIG. 4*i*, the user has entered the text string "Hello world" but has not yet pressed return; therefore, the text string is shown in a rough manner. Once the user presses return, the client sends the text string to the server for conversion to an image, which is then sent to the client and displayed on work area 410, as is shown in FIG. 4*j*. The reason this is accomplished is that different computers have different font generation engines, while the authoring program is desirably a what-you-see-is-what-you-get (WYSIWYG) program, showing the user on the display device exactly what will be printed at the printer.

Figure 4K:
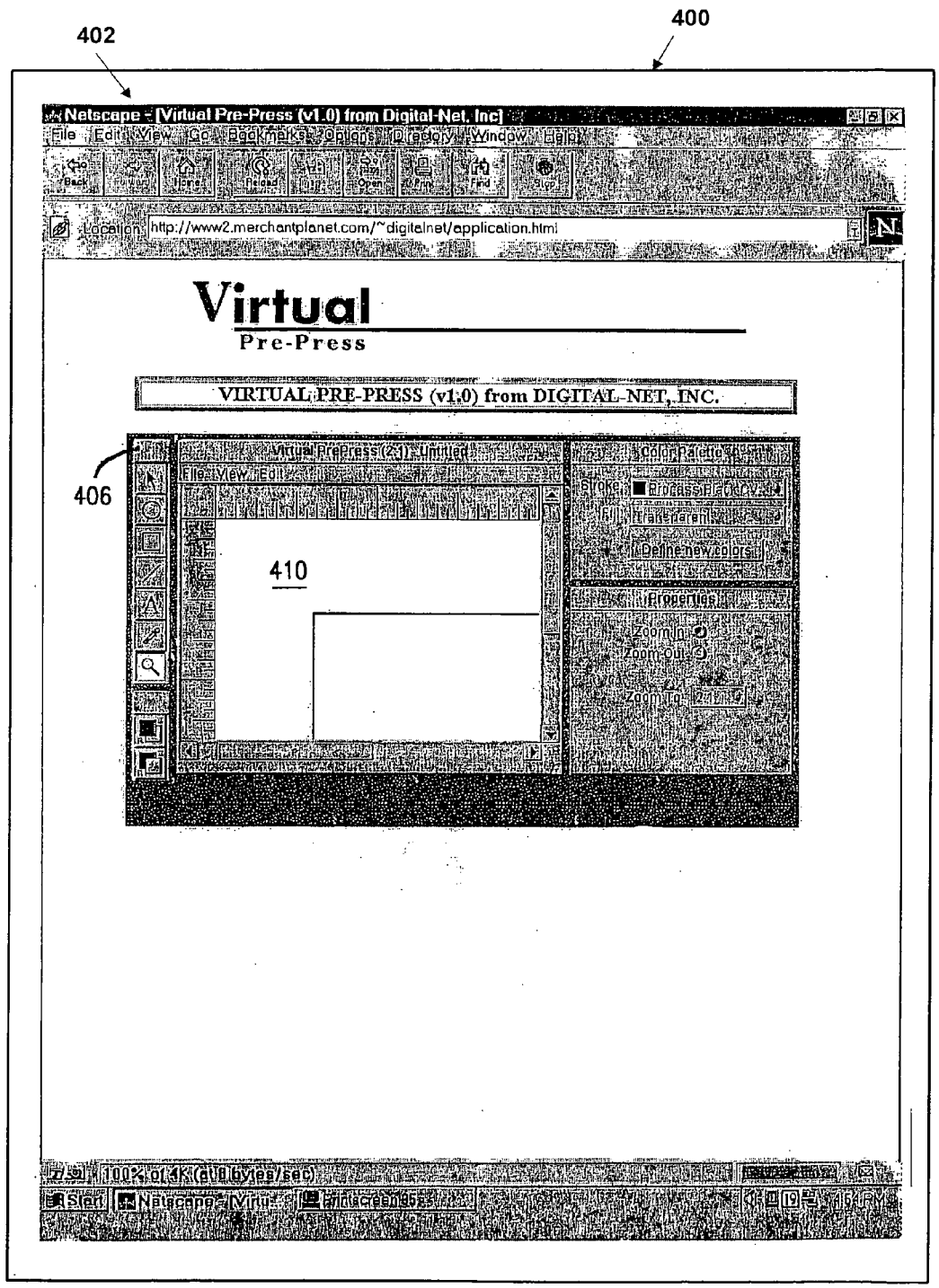
Figure 4I:
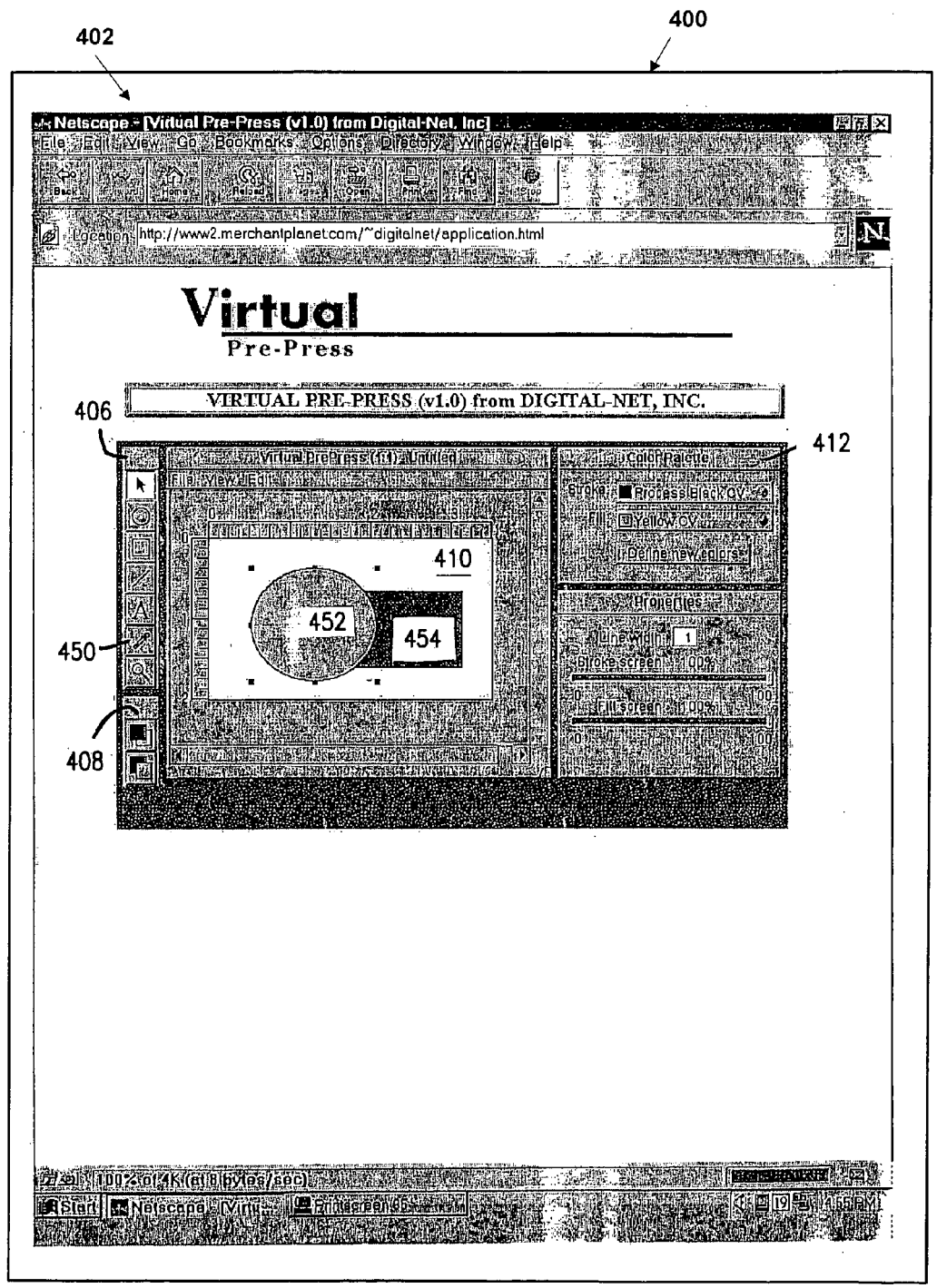

Referring next to FIG. 4*k*, selecting the zoom tool on tool bar 406 enables a user to zoom in and out on the document within work area 410, as is shown in FIG. 4*k*. Referring to FIG. 4*l*, selecting the color picker tool (tool 450) on tool bar 406 enables a user to set a color within color palette area 412 to that of a current object within work area 410. For example, clicking within object 452 in work area 410 while using the color picker tool sets the current fill color to that of the fill color of object 452. This enables users to precisely set a color to an already existing color within the document, which is especially advantageous in situations where there are multiple shades of one color in a document, which may be difficult to discern.

Figure 4M:
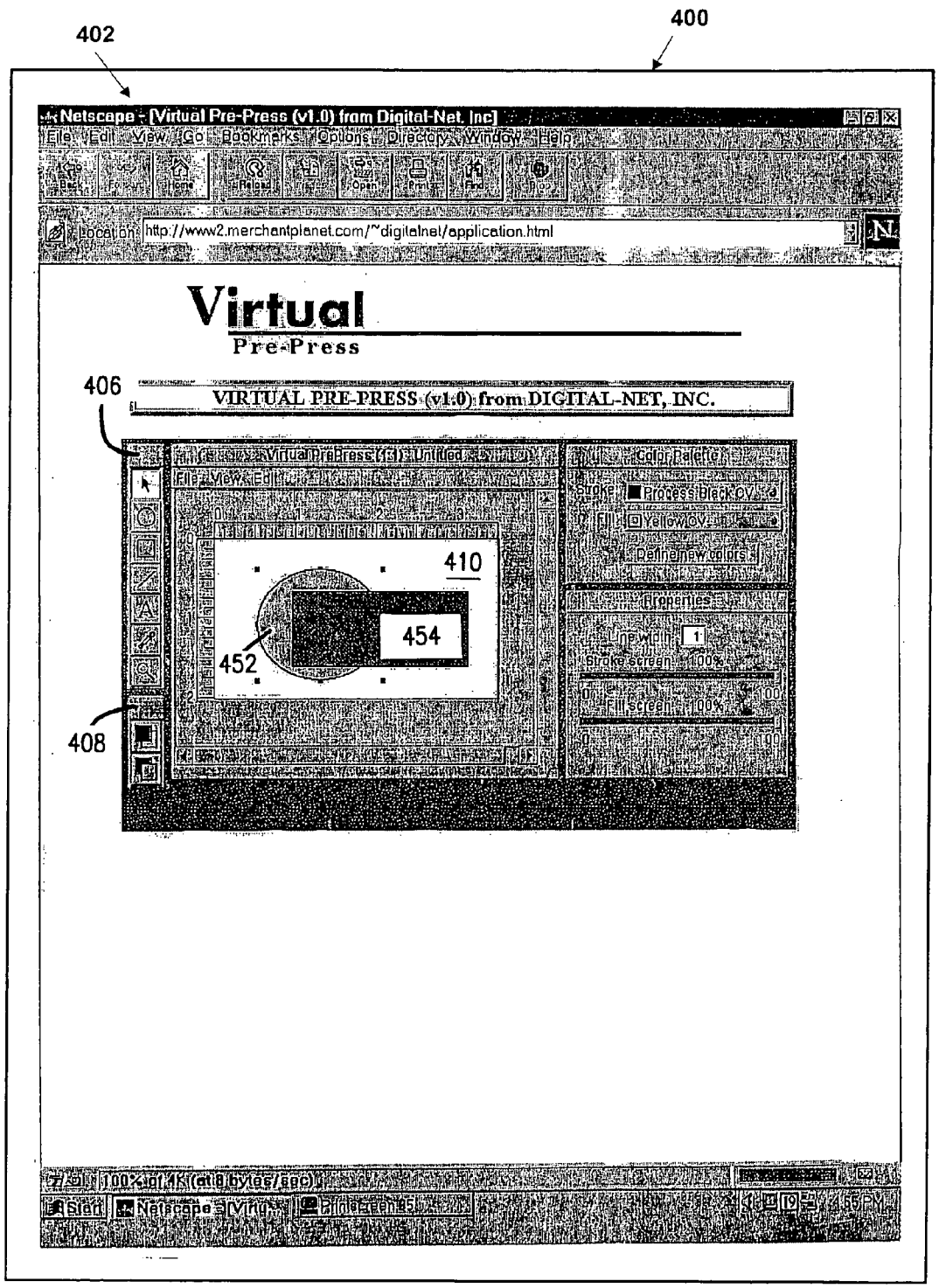

Selecting the top icon within orientation bar 408 brings the currently selected object within area 410 to the front of other objects. For example, as shown in FIG. 4*l*, selecting the top icon while object 452 is selected (as denoted by dots outlining the rectangular boundary of the object) brings object 452 to the front, over the other object within the work area (e.g., object 454). Conversely, selecting the bottom icon within orientation bar 408 moves the currently selected object within area 410 to the back of other objects. For example, as shown in FIG. 4*m*, selecting the bottom icon while object 452 is selected moves object 452 to the back, behind the other object within the work area (e.g., object 454).

Computerized prepress has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. For example, the invention is fully intended to cover databases as well as dynamic directories, such that the term directory may be interpreted to encompass any database amenable to the invention in such an embodiment of the invention. Therefore, it is manifestly intended that this invention be limited only by the following claims and equivalents thereof.

We claim:

1. A computerized method for creating a document to be printed, the method comprising:

downloading from a server to a client computer a document software system having one or more authoring tools for allowing the user of the client computer to create a document at the client computer, the software system being adapted to execute in a web browser of the client computer and executing the software system one or more of the downloaded authoring tools in the browser in response to user commands to allow the user to select and edit at least one element of the document while at least a portion of the document is simultaneously displayed to the user in a form representing the document as it will appear when the document is printed.

2. The method of claim 1 further comprising producing a printed version of the document on a printing device such that the printed version of the document is consistent with the appearance of the document as displayed to the user on the client computer.

3. The method of claim 2 wherein the step of producing a printed version includes the step of translating the document to a prepress file format as required to produce the printed version on the printing device.

4. The method of claim 1 wherein at least one type of document editing is accomplished completely at the client and at least one type of document editing involves transmission of edit information to the server.

5. The method of claim 1 further comprising determining the authorization level of the user and controlling the availability of the authoring tools based on the authorization level of the user.

6. The method of claim 1 wherein the server maintains a document storage area for storing at least documents created by a plurality of users and further comprising determining the authorization level of the user and controlling the user's access to the document storage area of the server based on the user's authorization level.

7. The method of claim 1 further comprising authenticating the user and controlling the availability of the authoring tools based on the user's authentication.

8. The method of claim 1 wherein the server maintains a document storage area for storing at least documents created by a plurality of users of client computers and further comprising authenticating the user and controlling the user's access to the document storage area of the server based on the user's authentication.

9. The method of claim 1 wherein the at least one downloaded authoring tool has one or more functions adapted to display at least one tool for editing the document simultaneously with the display of the at least a portion of the document.

10. The method of claim 1 further comprising executing the software system in response to one or more user commands to allow the user to insert an image into the document.

11. A system for creating a document to be printed, the system comprising:
at least one server, and
a document software system stored on the at least one server, wherein the software system includes one or more authoring tools, at least one of the authoring tools adapted to download to a client computer, wherein at least one downloaded authoring tool is a program that is adapted to execute in a web browser of the client computer and to allow the user to select and edit at least one element of the document while at least a portion of the document is simultaneously displayed in a form representing the document as it will appear when the document is printed.

12. The system of claim 11 wherein the document software system includes one or more programs for translating the document into a prepress file format as required to produce a printed version of the document on a printing device.

13. The system of claim 11 further comprising at least one printing device capable of producing a printed version of the document such that the printed version of the document is consistent with the appearance of the document as displayed to the user on the client computer.

14. The system of claim 11 wherein at least one downloaded tool is adapted to perform at least one type of document editing completely at the client and at least one downloaded tool is adapted to perform at least one type of document editing in combination with the server.

15. The system of claim 11 wherein the software system is adapted to determine the authorization level of the user and control the availability of the authoring tools based on the authorization level.

16. The system of claim 11 wherein the server comprises a document storage area for storing at least documents created by a plurality of users of clients computers and wherein the software system is adapted to determine the authorization level of the user and control the user's access to the document storage area of the sewer based on the authorization level.

17. The system of claim 11 wherein the software system is adapted to authenticate the user and control the availability of the authoring tools based on the user's authentication.

18. The system of claim 11 wherein the sewer comprises a document storage area for storing at least documents created by a plurality of users of clients computers and wherein the software system is adapted to authenticate the user and control the user's access to the document storage area of the server based on the user's authentication.

19. The system of claim 11 wherein the at least one downloaded authoring tool has one or more functions adapted to display at least one tool for editing the document simultaneously with the display of the at least a portion of the document.

20. The system of claim 11 wherein the software system further includes at least one document creation tool adapted to allow the user to insert an image into the document.

21. A computer-readable medium carrying computer readable instructions for creating a document to be printed, the instructions comprising:
authoring tool instructions executable in the browser of a client computer for allowing the user of the client computer to create a document at the client computer and authoring tool instructions executable in the browser of the client computer for allowing the user to select and edit at least one element of the document while at least a portion of the document is simultaneously displayed to the user in a form representing the document as it will appear when the document is printed.

22. The medium of claim 21 wherein at least one authoring tool is adapted further comprising instructions to allow the user to request that a printed version of the document be generated.

23. The medium of claim 21 wherein the instructions available to the user are determined based on the user's authorization level.

24. The medium of claim 21 wherein the instructions available to the user are determined based on the user's authentication.

25. The medium of claim 21 wherein the server maintains a document storage area for storing at least documents created by a plurality of users of client computers and wherein the user's access to the document storage area of the server is determined by the server based on the user's authorization level.

26. The medium of claim 21 wherein the server maintains a document storage area for storing at least documents created by a plurality of users of client computers and wherein the user's access to the documentation storage area of the server is determined by the server based on the user's authentication.

27. The medium of claim 21 further comprising instructions to display at least one tool for editing the document simultaneously with the display of the at least a portion of the document.

28. The medium of claim 21 further comprising instructions executable in the browser of the client computer for allowing the user to insert an image into the document.

29. A method of creating an electronic document to be printed using a computer executing a web browser, the method comprising:
accessing a server having stored thereon one or more downloadable authoring tools, downloading one or more authoring tools from the server to the computer, and executing one or more of the downloaded authoring tools in the browser to create a document at the computer and to perform user edits to at least one element of the document while at least a portion of the document is simultaneously displayed to the user in a form representing the document as it will appear when the document is printed.

30. The method of claim 29 further comprising uploading the created document to the server and translating the uploaded document into the prepress file format required by a printing device.

31. The method of claim 30 further comprising the step of producing a printed version of the document on the printing device.

32. The method of claim 31 wherein the step of producing a printed version of the document is performed in response to a request from the computer.

33. The method of claim 29 further comprising executing one or more downloaded tools in the browser to insert an image into the document.

34. A computer-implemented method for creating a document to be printed, the method comprising downloading one or more authoring tools from a server to a client computer over a network, the downloaded authoring tools being adapted to execute in the browser of the client computer, executing one or more downloaded authoring tools in response to one or more commands from the user of the client computer to create a document at the client computer, executing one or more downloaded authoring tools in response to one or more commands from the user to insert an image into the document, executing one or more downloaded authoring tools in response to one or more commands from the user to modify at least one element of the document while at least a portion of the document is being displayed to the user in a form representing the document as it would appear if printed.

35. The method of claim 34 wherein at least one of the downloaded tools is downloaded in response to one or more commands from the user.

36. The method of claim 34 further comprising executing one or more downloaded tools in response to one or more commands from the user to upload the created document to the server.

37. The method of claim 36 further comprising executing one or more downloaded tools in response to one or more commands from the user to transmit to the server a request that the document be printed.

38. The method of claim 37 further comprising printing the document.

39. The method of claim 34 further comprising translating the document into a prepress format.

40. The method of claim 39 further comprising printing the translated document.

41. The method of claim 34 further comprising displaying to the user a menu of available document types and, in response to selection by the user of a document type, providing a display corresponding to the type of document selected.

42. The method of claim 34 wherein executing one or more downloaded tools to modify at least one element of the document includes modifying the color of at least one element.

43. A computer readable medium having computer-readable instructions thereon which, when executed by a computer, implement the method of claim 34.

44. The computer-readable medium of claim 43 wherein the computer readable medium comprises a carrier wave communicated over a network.

* * * * *

UNITED STATES PATENT AND TRADEMARK OFFICE
CERTIFICATE OF CORRECTION

PATENT NO.       : 7,120,634 B2
APPLICATION NO.  : 09/877266
DATED            : October 10, 2006
INVENTOR(S)      : Jecha et al.

It is certified that error appears in the above-identified patent and that said Letters Patent is hereby corrected as shown below:

Column 8
Line 25, delete "web".

Column 8
Line 27, delete "the software system".

Column 9
Line 16, delete "web"

Column 9
Line 17, delete "and" at the first occurrence on the line.

Column 10
Line 41, delete "web".

Signed and Sealed this

Thirteenth Day of March, 2007

JON W. DUDAS
*Director of the United States Patent and Trademark Office*

(12) EX PARTE REEXAMINATION CERTIFICATE (8223rd)
United States Patent
Jecha et al.

(10) Number: US 7,120,634 C1
(45) Certificate Issued: May 10, 2011

(54) COMPUTERIZED PREPRESS

(75) Inventors: Steven Jecha, Minneapolis, MN (US); Winfield A. Mitchell, Minneapolis, MN (US)

(73) Assignee: Vistaprint Technologies Limited, Hamilton (BM)

Reexamination Request:
No. 90/009,287, Oct. 3, 2008
No. 90/009,314, Mar. 23, 2009

Reexamination Certificate for:
Patent No.: 7,120,634
Issued: Oct. 10, 2006
Appl. No.: 09/877,266
Filed: Jun. 8, 2001

Certificate of Correction issued Mar. 13, 2007.

Related U.S. Application Data

(63) Continuation of application No. 08/982,438, filed on Dec. 2, 1997, now Pat. No. 6,247,011.

(51) Int. Cl.
*G06F 17/21* (2006.01)
*G06F 7/00* (2006.01)
*G06F 17/30* (2006.01)
*G06F 17/00* (2006.01)

(52) U.S. Cl. .............. 707/9; 707/608; 707/E17.009; 707/100; 715/200; 715/202; 715/209; 715/255; 715/273; 715/274; 715/275

(58) Field of Classification Search .................. None
See application file for complete search history.

(56) References Cited

U.S. PATENT DOCUMENTS

| | | | |
|---|---|---|---|
| 5,483,653 A | 1/1996 | Furman | |
| 5,572,643 A | 11/1996 | Judson | |
| 5,748,963 A | 5/1998 | Orr | 395/704 |
| 5,822,587 A | 10/1998 | McDonald et al. | 395/702 |
| 5,838,906 A | 11/1998 | Doyle et al. | 395/200.32 |
| 5,895,476 A | 4/1999 | Orr et al. | 707/517 |
| 5,895,477 A | 4/1999 | Orr et al. | 707/517 |
| 5,903,902 A | 5/1999 | Orr et al. | 707/517 |
| 5,930,810 A | 7/1999 | Farros et al. | |
| 5,956,737 A | 9/1999 | King et al. | 707/517 |
| 6,161,114 A | 12/2000 | King et al. | 707/517 |

OTHER PUBLICATIONS

Pages from the Corel Office for Java website retrieved from archive.org and accompanying affidavit, dated Nov. 19, 1996 and Jan. 13, 1997 and archived Dec. 19, 1996 and Feb. 10, 1997.

Sommergut, Wolfgang, *Office Solutions for the Slim Client*, Mar. 1997, Germany, along with original foreign language version.

Brors, Dieter, *Internet–Office: Office Packages Increasingly Application Servers*, May 1997, Germany, along with original foreign language version.

Michel, Dieter, *Applix Anyware and Corel Office for Java: Thick and Thin*, Jul. 1997, Germany, along with original foreign language version.

Seybold Special Report, *Electronic Delivery, High–Res Output, Short–Run Printing*, Sep. 26, 1995 and Oct. 23, 1995, San Francisco, CA.

Welcome to Amaya. W3C, 2007 [retrieved 2007] Amaya Editor/Browser Retrieved from the Intenet: <URL: www.w3.org> ABC0016203 to ABC0016424.

(Continued)

*Primary Examiner* — William H. Wood

(57) ABSTRACT

Computerized prepress is disclosed. In one embodiment, a computerized prepress system includes three components; a server, a client and a printer. The server has stored thereon an authoring program to create a document, and a translation program to translate the document to a suitable prepress format. The client downloads the authoring program from the server to create the document, and then uploads the document to the server for translation to the suitable prepress format. The printer receives the document as translated to the suitable prepress format from the server.

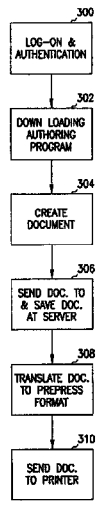

OTHER PUBLICATIONS

Doyle, M., Ang, C. and Martin, D. *Proposing a Standard Web API*, Dr. Dobb's Journal (Feb. 1996) pp. 18–26 ABC11748–754.

'iPrint Discount Printing Shop Awarded Twice During Internet Grand Opening' dated Jan. 17, 1997, pp. 11–12, PR Newswire Association, Inc. ABC0011639–11640.

'Talk City Welcomes eCommerce to its Internet Community; Launches New Online Shopping Area with FAO Schwarz, Amazon.com, CyberShop, eToys, iPrint, First Auction, ISN's Computer Superstore, Worldview Systems and Talk City's own Company Store' dated Dec. 9, 1997, pp. 4–6, PR Newswire Association, Inc. ABC0011666–11668.

'commerceNet Names iPrint Electronic Commerce Winner; VIP (very Innovative Practice) Award Given to Online Print Shop,' dated Nov. 12, 1997, p. 9, PR Newswire Association, Inc. ABC0011671.

'iPrint Announces Presonalized Holiday Cards; Now You Can Design and Order Professionally Printed Holiday Cards Directly Online', dated Oct. 27, 1997, pp. 13–14, PR Newswire Association, Inc. ABC0011675–11676.

'Prodigy Partners with iPrint; Internet Discount Stationery Leader iPrint to Provide Online Design and Printing Services for Prodigy Members' dated Sep. 30, 1997, pp. 15–16, PR Newswire Association, Inc. ABC0011677–11678.

'Internet Discount Stationery Leader iPrint to Offer Online Design and Printing Services via Apple Small Business Website,' dated Sep. 17, 1997, pp. 17–18, PR Newswire Association, Inc. ABC0011679–11680.

'EarthLink Network to Offer Electronic Shopping With Top Retail Brands,' dated Sep. 9, 1997, pp. 19–20, PR Newswire Assocation, Inc., ABC0011681–11682.

'iPrint Qualifies for Excite Certified Merchant Program Internet Discount Stationery Leader iPrint Participates in Launch,' dated Sep. 4, 1997, pp. 21–22, PR Newswire Association, Inc. ABC0011683–11684.

'CSi CompuServe Partners with iPrint; Internet Discount Stationery Leader iPrint to Provide Online Design and Printing Services for CSi Members', dated Sep. 3, 2997, pp. 23–24, PR Newswire Association, Inc. ABC0011685–11686.

'TENERON.com and iPrint, Inc. Announce Strategic Partnership Agreement' dated Aug. 15, 1997, pp. 25–26, PR Newswire Association, Inc. ABC0011687–11688.

'iPrint Honored for Business Excellence on the Web by IDG's WebMaster Magazine' dated Aug. 15, 1997, pp. 27–28, PR Newswire Association, Inc. ABC0011689–11690.

'iPrint Introduces CyberStationery; iBizCards, iAnnounce, & iInvites Are First Online Versions of Printed Stationery', dated Jul. 29, 1997, pp. 32–33, PR Newswire Association, Inc. ABC0011694–11695.

'Fee Me', dated Jul. 17, 1997, p. 34, PR Newswire Association, Inc. ABC0011696.

'iPrint, Internet Shopping Network Partner; iPrint to Provide Online Design and Printing for ISN,' dated Jul. 15, 1997, pp. 35–36, PR Newswire Association, Inc. ABC0011697–11698.

'iPrint Partners with ONVILLAGE; iPrint to Provide Online Design and Printing for ONVILLAGE Yellow Pages Customers,' dated Jul. 1, 1997, p. 37, PR Newswire Association, Inc. ABC0011699.

'iPrint Offers Online Discount Printing via Fourll; iPrint Extends Popular Online Design and Printing Service to fourll.com,' dated Jun. 23, 1997, p. 38, PR Newswire Association, Inc. ABC0011700.

'iPrint joins PointCast Connections Superchannel; iPrint Develops Premier Printing Channel on the Internet,' dated Jun. 17, 1997, pp. 39–40, PR Newswire Association, Inc. ABC0011701–11702.

'iPrint and onQ Announce Partnership; Internet Discount Stationery Leader iPrint to Provide Online Design and Printing for onQ Gay Forum Members,' dated Jun. 16, 1997, p. 41, PR Newswire Association, Inc. ABC0011703.

'InfoSpace Partners With iPrint; Internet Discount Stationery Leader iPrint to Provide Online Design and Printing for InfoSpace Customers,' dated Jun. 16, 1997, p. 42, PR Newswire Association, Inc. ABC0011704.

'iPrint Adds Labels, New Graphics to Internet Print Shop,' dated Jun. 12, 1997, p. 43, PR Newswire Association, Inc. ABC0011705.

'Self–Service Stationery,' dated May 20, 1997, pp. 44–46, PR Newswire Association, Inc. ABC0011706–11708.

'Internet Stationery Leader iPrint, Inc. Announces Rubber Stamps and Server Clustering,' dated May 13, 1997, p. 47, PR Newswire Association, Inc. ABC0011709.

'Taking Printing to the 'Net; Offers printing services over the Internet,' dated May 1997, pp. 48–49, PR Newswire Association, Inc. ABC0011710–11711.

'Internet Stationery Leader iPring Helps Seattle Business Cope With the Costs of Area Code Changes; iPrint Discount Print Shop Provides Online Design and Printing Services at up to 70% Off of Traditional Commercial Print Costs,' dated Apr. 30, 1997, p. 50, PR Newswire Association, Inc. ABC0011712.

'Internet Stationery Leader iPrint Partners with Fourll's RocketMail; iPrint Internet Discount Print Shop to Provide Online Design and Printing Services for RocketMail Customers in a Co–label Agreement,' dated Apr. 24, 1997, pp. 51–52, PR Newswire Association, Inc. ABC0011713–11714.

'iPrint Lets You Design Your Own Money on the Internet and Save Big $'s,' dated Apr. 1, 1997, p. 53, PR Newswire Association, Inc. ABC0011715.

'Internet Business Card Leader iPrint, Inc. Announces Letterhead and Envelopes Extensions; Now You can Design and Order Discount Envelopes, Letterhead, Even Import Your Company's Logo,' dated Mar. 7, 1997, pp. 54–55, PR Newswire Association, Inc. ABC0011716–11717.

'Shop Lets Customers Be Designers, Via Browser,' dated Feb. 17, 1997, pp. 56–57, PR Newswire Association, Inc. ABC0077718–11719.

'iPrint, the Internet discount printing shop of the future provides commercial thermography using the BCT system,' dated Jan. 31, 1997, pp. 58–59, PR Newswire Association, Inc. ABC0011720–11721.

'BCT announces a strategic agreement with iPrint, the Internet discount printing shop,' dated Jan. 30, 1997, p. 60, PR Newswire Association, Inc. ABC0011722.

'iPrint Discount Printing Shop Awarded Twice During Internet Grand Opening,' dated Jan. 17, 1997, pp. 61–62, PR Newswire Association, Inc. ABC0011723–11724.

'Printer Utilities: Page Formatting Programs,' dated May 11, 1987, pp. 63–67, PR Newswire Association, Inc. ABC0011725–11729.

'Indigo Software Ltd. Has unveiled lPint, a forms and graphics generation program for laser printers. Lprint is said to allow the use of an IBM Personal Computer to draw forms and graphics interactively on the screen using a mouse or a cursor and function keys and to save the results as an electronic forml lprint supports printers from Hewlett–Packard Col, Canon, Inc., IBM and NCR Corp. It costs $259. Indigo Software, 1568 Carling Ave., Ottawa, Ont., Canada K12 7M5,' dated Mar. 3, 1986, p. 68, New Products; Microcomputers; Software utilities; p. 78 Computerworld, Inc. ABC0011730.

'SPA Names iPrint a Finalist for Prestigious SPA Codie Award; iPrint Professional Print Shop Sets New Standard for Interactive E–Commerce,' dated Dec. 16, 1997, p. 1, PR Newswire Association, Inc. ABC0011731.

'iPrint Announces Personalized Holiday Cards; Now You can Design and Order Professionally Printed Holiday Cards Directly Online,' dated Oct. 27, 1997, pp. 2–3, PR Newswire Association, Inc. ABC0011732–11733.

'Internet Stationery Leader iPrint Helps San Francisco Bay Area Business Cope With the Costs of Area Code Changes; iPrint Discount Print Shop Provides Online Design and Printing Services,' dated Jul. 30, 1997, p. 4, PR Newswire Association, Inc. ABC0011734.

'iPrint Introduces CyberStationery; iBizCards, iAnnounce, & iInvites Are First Online Versions of Printed Stationery,' dated Jul. 29, 1997, pp. 5–6, PR Newswire Association, Inc. ABC0011735–11736.

'Fee Me,' dated Jul. 17, 1997, p. 7, PR Newswire Association, Inc. ABC0011737.

'iPrint Offers Online Discount Printing via Fourll; iPrint Extends Popular Online Design and Printing Service to Fourll.com,' dated Jun. 23, 1997, p. 8, PR Newswire Association, Inc. ABC0011738.

'iPrint joins PointCast Connections Superchannel; iPrint Develops Premier Printing Channel on the Internet,' dated Jun. 17, 1997, pp. 9–10, PR Newswire Association, Inc. ABC0011739–11740.

'iPrint and onQ Announce Partnership; Internet Discount Stationery Leader iPrint to Provide Online Design and Printing for onQ Gay Forum Members,' dated Jun. 16, 1997, p. 11, PR Newswire Association, Inc. ABC0011741.

'Internet Stationery Leader iPrint Helps Seattle Business Cope With the Costs of Area Code Changes; iPrint Discount Print Shop Provides Online Design and Printing Services at up to 70% Off of Traditional Commercial Print Costs,' dated Apr. 30, 1997, p. 12, PR Newswire Association, Inc. ABC0011742.

'iPrint Lets You Design Your Own Money on the Internet and Save Big $'s,' dated Apr. 1, 1997, p. 13, PR Newswire Association, Inc. ABC0011743.

'Internet Business Card Leader iPrint, Inc. Announces Letterhead and Envelopes Extensions; Now You Can Design and Order Discount Envelopes, Letterhead, Even Import Your Company's Logo,' dated Mar. 7, 1997, pp. 14–15, PR Newswire Association, Inc. ABC0011744–11745.

'iPrint Discount Printing Shop Awarded Twice During Internet Grand Opening,' dated Jan. 17, 1997, pp. 16–17, PR Newswire Association, Inc. ABC0011746–11747.

Edwards, S., Kingsley, L., Votsch, V., Walter, M. 'Roll over, Gutenberg: how the Web is changing printing,' Seybold Report on Internet Publishing, v2, n1, p. 5(16) Sep. 1997 VP0006144–6162.

Agenda May 7–9, 1996, Fifth International World Wide Web Conference May 6–10, 1996, Paris, France ABC0016045–16056.

Crespo, A. and Bier, E.A., 'WebWriter: A Browser–Based Editor for Constructing Web Applications,' Fifth International World Wide Web Conference May 6–10, 1996, Paris, France ABC0016057–16077.

'World's Easiest; Deluxe's World's Easiest Business Essentials DPT software; Software Review; Brief Article; Evaluation' dated May 1997, pp. 3–4, Copyright 1997 Information Access Company, a Thompson Corporation Company; ASAP Copyright 1997 Ziff–Davis Publishing Company PC/Computing ABC0011585–11586.

'Marketing Mix: The castaway client' dated Feb. 6, 1997, p. 5, Copyright 1997 Haymarket Publishing Services Ltd. Marketing ABC0011587.

'Risky business; Deluxe Corp's World's Easiest Business Essentials business printing software; Software Review; Brief Article; Evaluation' dated Feb. 1997, p. 6, Copyright 1997 Information Access Company, a Thompson Corporation Company; ASAP Copyright 1997 Ziff–David Publishing Company Windows Sources ABC0011588.

'Risky business; Deluxe Corp's World's Easiest Business Essentials business printing software; Software Review; Brief Article Evaluation' dated Feb. 1997, p. 7, Copyright 1997 Information Access Company, a Thompson Corporation Company; ASAP Copyright 1997 Ziff–Davis Publishing Company Windows Sources ABC0011589.

'World's Easiest Software for OS/2 Warp Ships Today As Part of Deluxe Corporation and IBM Joint Marketing Agreement' dated Dec. 6, 1996, pp. 8–9, Copyright 1996 PR Newswire Association, Inc. PR Newswire ABC0011590–11591.

'World's Easiest Offers Free Holiday Ink Stamp Software on the Internet; Custom Address Stamps Add a Festive Touch to Holiday Greetings' dated Nov. 27, 1996, pp. 10–11, Copyright 1996 PR Newswire Assocation, Inc. PR Newswire ABC0011592–11593.

'Deluxe Launches World's Easiest Business Cards Limited Edition New Free Software Download Lets Computer Users Try Before They Buy,' dated Nov. 14, 1996, pp. 12–13, Copyright 1996 PR Newswire Association, Inc. PR Newswire ABC0011594–11595.

'Deluxe Launches Improved World's Easiest On–Line Printing Service; New Software and Services Provide the Easiest Way Yet to 'Print Now or Print Professionally'' dated Sep. 25, 1996, pp. 14–15 Copyright 1996 PR Newswire Association, Inc. PR Newswire ABC0011596–11597.

'Deluxe Software Licensed' dated Jun. 13, 1996, p. 16 Copyright 1996 Saint Paul Pioneer Press All Rights Reserved Saint Paul Pioneer Press (Minnesota) ABC0011598.

'Deluxe Corporation Enters Licensing Agreement With IBM IBM Licenses World's Easiest Software for the Aptiva Personal Computer' dated Jun. 12, 1996, pp. 17–18 Copyright 1996 PR Newswire Association, Inc. PR Newswire ABC0011599–11600.

'Deluxe Corporation and IBM Announce World's Easiest Software for OS/2 Warp Environment' dated Apr. 17, 1996, p. 19, Copyright 1996 PR Newswire Association, Inc. PR Newswire ABC0011601.

'World's Easiest Announcements lives up to its name; T/Maker's World's Easiest Announcements announcement design software; Software Review; Evaluation; Brief Article' dated Apr. 1996, pp. 20–21, Copyright 1996 Information Access Company, a Thompson Corporation Company; ASAP Copyright 1996 Ziff Davis Publishing Company Computer Shopper ABC0011602–11603.

'High Tech Holiday Gifts' dated Dec. 2, 1995, pp. 22–23, Copyright 1995 Cable News Network, Inc. ABC0011604–11605.

'For the World's Easiest Personal Image Bundle, a cliché rings true; T/Maker Co; Software Review; Brief Article; Evaluation' dated Dec. 1995, pp. 24–25, Copyright 1995 Information Access Company, a Thompson Corporation Company; ASAP Copyright 1995 Ziff Davis Publishing Company Computer Shopper ABC0011606–11607.

'Business Image Bundle; T/Maker Co's World's Easiest Business Image Bundle Beginning business graphics software; Windows 95 Buyers Guide; Software Review; Brief Article; Evaluation' dated Dec. 1995, pp. 26–27, Copyright 1995 Information Access Company, a Thompson Corporation Company; ASAP Copyright 1995 Ziff Davis Publishing Company PC/Computing ABC0011608–609.

'Runners Rack Up Mileage' dated Sep. 15, 1995, pp. 28–29, Copyright 1995 The Roanoke Times (Virginia) ABC0011610–11611.

'T/Maker Introduces World's Easiest Software Line; Deluxe subsidiary's software makes creating customized products as easy to use as a push–button appliance' dated Aug. 28, 1995, pp. 30–31, Copyright 1995 PR Newswire Association, Inc. ABC0011612–11613.

'Apple Delivers Next Generation of Portable Performance With New PowerPC Processor–Based Macintosh Powerbook 5300; PowerBook 5300 Models Lead Industry in Price/Performance' dated Aug. 28, 1995 Copyright 1995 PR Newswire Association, Inc. ABC0011614–11617.

'T/Maker Introduces World's Easiest Software Line; a Brand New Line of Software that Makes Creating Customized Products as Easy as Using a Push–Button Appliance' dated Aug. 25, 1995, pp. 36–37 Copyright 1995 Business Wire, Inc. ABC0011618–11619.

'World's Easiest Software Offers Simple Graphics Design' dated Aug. 24, 1995, pp. 38–39 Copyright 1995 Post–Newsweek Business Information Inc. Newsbytes ABC0011620–11621.

'T/Maker Introduces World's Easiest Software Line; A Brand New Line of Software That Makes Creating Customized Products As Easy to Use As a Push–Button Appliance' dated Aug. 18, 1995, pp. 40–42 Copyright 1995 PR Newswire Association, Inc. ABC0011622–11624.

'Activesystems Announces World's Easiest–to–Use Document Storage and Retreival Product for Client/Server Environments' dated Mar. 24, 1994, pp. 43–44 Copyright 1994 Canada NewsWire Ltd. ABC0011625–11626.

'Activesystems Announces World's Easiest–to–Use Document Storage and Retreival Product for Client/Server Environments' dated Mar. 24, 1994, pp. 45–46 Copyright 1994 PR Newswire Association, Inc. ABC0011627–11628.

Bericht, CW, Sommergut, W., 'Widerstreitende Ansätze Office–Lösungen für den schlanken Client' dated Nov. 1997, Heft 5, VP0015588–15598.

Sommergut, W., 'Competing Approaches, Office Solutions for the Slim Client' dated Nov. 1997, Heft 5, ABC0037761–37773.

'Commission File No. 0–25040 Applix, Inc.' U.S. Securities and Exchange Commission Form 10–K/A dated Dec. 31, 2000 ABC0038057–38076.

'Commission File No. 0–25040 Applix, Inc.' U.S. Securities and Exchange Commission Amendment No. 1 to Form 10 K/A dated Dec. 31, 2000 ABC0038077–38161.

'Corel Office for Java Certified 100% Pure Java' dated May 1, 1997, 2008 Novell, Inc., ABC0037900–37901.

'WordPerfect for IBM Personal Computers' Version 5.0 WordPerfect Corporation 1989, ABC0037931–37934.

'WordPerfect Suite 8 User's Guide' Corel Corporation Limited, 1997, ABC0037935–37981.

Seybold Special Report 'SSF '95, Part I, Electronic Delivery, High–Res Output, Short–Run Printing' © 1995 Business Wire, © 1994 Gale Group VP0015949–15952.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 44 is cancelled.

Claims 1, 4, 10, 11, 14, 16, 20, 21, 28, 29, 33 and 34 are determined to be patentable as amended.

Claims 2-3, 5-9, 12-13, 15, 17-19, 22-27, 30-32 and 35-43, dependent on an amended claim, are determined to be patentable.

1. A computerized method for creating a document to be printed, the method comprising:
   downloading from a server to a client computer a document software system having one or more authoring tools for allowing the user of the client computer to create a document at the client computer, the software system being adapted to execute in a browser of the client computer and
   executing one or more of the downloaded authoring tools in the browser in response to user commands to allow the user to select and edit at least one element of the document while at least a portion of the document is simultaneously displayed to the user in a form representing the document as it will appear when the document is printed,
   *wherein at least one type of document editing is accomplished by selecting an element of the document and editing the document completely at the client and at least one different type of document editing is accomplished by selecting an element, sending edit information for the selected element to the server for generation of an image of the edited element, receiving at the client the image of the edited element from the server, and incorporating the image of the edited element into the document being displayed to the user.*

4. The method of claim 1 wherein [at least one type of document editing is accomplished completely at the client] *the document contains at least one text element and the* at least one *different* type of document editing [involves transmission of edit information to the server] *comprises selecting a text element in the document, sending, user-supplied edit information for the selected text element to the server, receiving from the server an image of the edited text element, and incorporating the received image into the displayed document.*

10. The method of claim 1 further comprising executing the software system [in response to one or more user commands] to insert [an] *the* image *of the edited element* into the document *in place of the selected element*.

11. A system for creating a document to be printed, the system comprising:
   at least one server, and
   a document software system stored on the at least one server, wherein the software system includes one or more authoring tools, at least one of the authoring tools adapted to download to a client computer, wherein at least one downloaded authoring tool is a program that is adapted to execute in a browser of the client computer to allow the user to select and edit at least one element of the document while at least a portion of the document is simultaneously displayed in a form representing the document as it will appear when the document is printed,
   *wherein at least one type of document editing is accomplished by selecting an element of the document and editing the document completely at the client and at least one different type of document editing is accomplished by selecting an element, sending edit information for the selected element to the server for generation of an image of the edited element, receiving at the client the image of the edited element from the server, and incorporating the image of the edited element into the document being displayed to the user.*

14. The system of claim 11 wherein [at least one downloaded tool is adapted to perform at least one type of document editing completely at the client and at least one downloaded tool is adapted to perform] *the document contains at least one text element and the* at least one type of *different* document editing [in combination with the server] *comprises selecting a text element in the document, sending user-supplied edit information for the selected text element to the server, receiving from the server an image of the edited text element, and incorporating the received image into the displayed document.*

16. The system of claim 11 wherein the server comprises a document storage area for storing at least documents created by a plurality of users of clients computers and wherein the software system is adpated to determine the authorization level of the user and control the user's access to the document storage are of the [sewer] *server* based on the authorization level.

20. The system of claim 11 wherein the software system further includes at least one document creation tool adapted [to allow the user] to insert [an] *the* image *of the edited element* into the document *in place of the selected element*.

21. A computer-readable medium carrying computer readable instructions for creating a document to be printed, the instructions comprising:
   authoring tool instructions executable in the browser of a client computer for allowing the user of the client computer to create a document at the client computer and authoring tool instructions executable in the browser of the client computer for allowing the user to select and edit at least one element of the document while at least a portion of the document is simultaneously displayed to the user in a form representing the document as it will appear when the document is printed,
   *wherein at least one type of document editing is accomplished by selecting an element of the document and editing the document completely at the client and at least one different type of document editing is accomplished by selecting an element, sending edit information for the selected element to the server for generation of an image of the edited element, receiving at the client the image of the edited element from the server, and incorporating the image of the edited element into the document being displayed to the user.*

28. The medium of claim 21 further comprising instructions executable in the browser of the client computer for [allowing the user to insert an] *inserting the* image *of the edited element* into the document *in place of the selected element*.

29. A method of creating an electronic document to be printed using a computer executing a browser, the method comprising:

accessing a server having stored thereon one or more downloadable authoring tools, downloading one or more authoring tools from the server to the computer, and executing one or more of the downloaded authoring tools in the browser to create a document at the computer and to perform user edits to at least one element of the document while at least a portion of the document is simultaneously displayed to the user in a form representing the document as it will appear when the document is printed,

*wherein at least one type of document editing is accomplished by selecting an element, sending edit information for the selected element to the server for generation of an image of the edited element, receiving at the client the image of the edited element from the server, and incorporating the image of the edited element into the document being displayed to the user.*

33. The method of claim 29 further comprising executing one or more downloaded tools in the browser to insert [an] *the* image *of the edited element* into the document *in place of the selected element*.

34. A computer-implemented method for creating a document to be printed, the method comprising downloading one or more authoring tools from a server to a client computer over a network, the downloaded authoring tools being adapted to execute in the browser of the client computer, executing one or more downloaded authoring tools in response to one or more commands from the user of the client computer to create a document at the client computer, executing one or more downloaded authoring tools in response to one or more commands from the user to *send user-supplied text to the server for generation of an image of the user-supplied text, receive the image from the server and* insert [an] *the received* image into the document *while at least a portion of the document is being displayed to the user in a form representing the document as it would appear if printed, and* executing one or more downloaded authoring tools in response to one or more commands from the user to modify at least one element of the document *at the client* while at least a portion of the document is being displayed to the user in a form representing the document as it would appear if printed.

\* \* \* \* \*